United States Patent
Yaguchi et al.

(10) Patent No.: US 8,580,452 B2
(45) Date of Patent: Nov. 12, 2013

(54) FUEL CELL ASSEMBLY

(75) Inventors: Tatsuya Yaguchi, Yokosuka (JP); Keiko Kushibiki, Fujisawa (JP); Yasushi Nakajima, Kawasaki (JP); Shigeo Ibuka, Ebina (JP); Kenji Ohara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 278 days.

(21) Appl. No.: 12/740,192

(22) PCT Filed: Oct. 28, 2008

(86) PCT No.: PCT/JP2008/003053
§ 371 (c)(1),
(2), (4) Date: Apr. 28, 2010

(87) PCT Pub. No.: WO2009/060568
PCT Pub. Date: May 14, 2009

(65) Prior Publication Data
US 2010/0248056 A1    Sep. 30, 2010

(30) Foreign Application Priority Data

Nov. 9, 2007 (JP) ................................. 2007-291735

(51) Int. Cl.
*H01M 8/24* (2006.01)
*H01M 8/04* (2006.01)
(52) U.S. Cl.
USPC ............................ 429/456; 429/454; 429/513
(58) Field of Classification Search
USPC ......................... 429/454, 456, 513
See application file for complete search history.

(56) References Cited

U.S. PATENT DOCUMENTS

| | | | |
|---|---|---|---|
| 7,041,406 B2 * | 5/2006 | Schuler et al. | ................. 429/440 |
| 7,226,681 B2 | 6/2007 | Florence et al. | |
| 2003/0054215 A1 | 3/2003 | Doshi et al. | |
| 2004/0043267 A1 | 3/2004 | Schuler et al. | |
| 2004/0086765 A1 | 5/2004 | Florence et al. | |
| 2008/0057365 A1 | 3/2008 | Kawazoe et al. | |

FOREIGN PATENT DOCUMENTS

| | | |
|---|---|---|
| EP | 0580918 A1 | 2/1994 |
| EP | 1734605 A1 | 12/2006 |
| EP | 1788656 A1 | 5/2007 |
| JP | 62-283570 A | 12/1987 |
| JP | 2003-282110 A | 10/2003 |
| JP | 2004-22343 A | 1/2004 |
| JP | 2004-139960 A | 5/2004 |
| JP | 2005-5074 A | 1/2005 |
| JP | 2005-293999 A | 10/2005 |
| JP | 2005-530326 A | 10/2005 |
| WO | WO 2006/106288 A2 | 10/2006 |

* cited by examiner

*Primary Examiner* — Patrick Ryan
*Assistant Examiner* — Ladan Mohaddes
(74) *Attorney, Agent, or Firm* — Foley & Lardner LLP

(57) ABSTRACT

A fuel cell apparatus (A1) includes a stack structure (B) including a plurality of solid electrolyte cell units (10) stacked with interspaces separating one another, and a case (20) enclosing the stack structure (B). The fuel cell apparatus (A1) further includes an inlet port (30) to introduce a reactant gas into the case (20), an outlet port (40) to discharge the reactant gas from the case (20), and a gas guide extending from the inlet port (30) along an outer periphery of the stack structure (B). The gas guide may include at least one guide member (50), and a heat transfer section.

31 Claims, 24 Drawing Sheets

FUEL CELL ASSEMBLY

TECHNICAL FIELD

The present invention relates to a fuel cell assembly including a stack structure of solid electrolyte cell units, and a case enclosing the stack structure.

BACKGROUND ART

A published Japanese Patent Application, Kokai No. 2004-139960 shows a fuel cell assembly in which a stack structure is enclosed by a case provided with a preheating cavity for heating a reactant gas preliminarily with heat released from the stack structure.

DISCLOSURE OF INVENTION

In general, the fuel cell assembly requires means for cooling the stack structure by introducing a cooling gas among the cell units in the stack structure in a high load operation in which the heat generated by the cell units becomes greater the heat dissipated from the stack structure.

Without such cooling means for supplying the cooling gas into interspaces among the cell units, the stack structure tends to become too hot, and high temperatures of the stack structure might cause increase in the electric resistance due to metal corrosion, decrease in the output of electric power generation due to detachment in the interface between a cell electrode layer and an electrolyte layer, and damage due to deterioration in the adhesion or bonding between a cell and a cell plate.

On the other hand, the direct introduction of the cooling gas into the interspaces among the cell units in the stack structure tends to make the temperature distribution uneven in the stack structure, and a resulting increased temperature difference between a cool side and a hot side in the stack structure could cause undesired deformation of metallic parts resulting in decrease in the performance of power generation due to poor contact or one-sided abutment of a current collector, and undesired influence of thermal stress such as thermal stress fracture due to difference in thermal expansion coefficient between the cells and cell plates.

The fuel cell assembly of the above-mentioned patent document is arranged to preheat a reactant gas by utilizing radiation heat from the stack structure in the preheating cavity, and thereby to provide performance recovering the heat and cooling the stack structure. However, this heat exchange system through radiation heat transfer is required to vary the operating temperature of the stack structure or decrease the temperature of the preheating cavity when the radiant heat from the stack structure is varied with variation in the load, so that it takes time to control the temperature of the stack structure to a desired temperature. Specifically when the load is varied steeply as in a fuel cell system for a vehicle, it is very difficult to uniformize the temperature distribution of the stack structure to a desirable level.

It is, therefore, an object of the present invention to provide fuel cell apparatus adequate for controlling the temperature of a stack structure in high load operation and low load operation, and for making uniform the temperature distribution of the stack structure.

According to the present invention, a fuel cell apparatus comprises: a stack structure including a plurality of solid electrolyte cell units stacked with interspaces each formed between two adjacent cell units; a case enclosing the stack structure; an inlet port to introduce a reactant gas into the case; an outlet port to discharge the reactant gas from the case; and a gas guide extending along an outer periphery of the stack structure from the inlet port.

BRIEF DESCRIPTION OF THE DRAWINGS

FIG. 1 (1A, 1B) shows a fuel cell assembly A1 according to a first embodiment of the present invention.

FIG. 4 (4A, 4B) shows a stack structure of the fuel cell assembly A1 of FIG. 1.

FIG. 7 (7A, 7B) shows a fuel cell assembly A4 according to a fourth embodiment.

FIG. 8 (8A, 8B) shows a fuel cell assembly A5 according to a fifth embodiment.

FIG. 9 (9A, 9B) shows a fuel cell assembly A6 according to a sixth embodiment.

FIG. 11 (11A, 11B) shows a fuel cell assembly A8 according to an eighth embodiment.

FIG. 12 (12A, 12B) shows a fuel cell assembly A9 according to a ninth embodiment.

FIG. 14 (14A, 14B) shows a fuel cell assembly A11 according to an eleventh embodiment.

FIG. 15 (15A, 15B) shows a fuel cell assembly A12 according to a twelfth embodiment.

FIG. 16 (16A, 16B) shows a fuel cell assembly A13 according to a thirteenth embodiment.

FIG. 17 (17A, 17B, 17C) shows a fuel cell assembly A14 according to a fourteenth embodiment.

FIG. 22 (22A, 22B, 22C) shows further examples of the segmented structure.

FIG. 23 (23A, 23B, 23C), shows examples of the insulating structure between the outlet pipe and stack structure.

FIG. 24 (24A, 24B, 24C) shows a fuel cell assembly A15 according to a fifteenth embodiment.

FIG. 25 (25A, 25B) shows a fuel cell assembly A16 according to a sixteenth embodiment.

FIG. 26 (26A, 26B) shows a fuel cell assembly A17 according to a seventeenth embodiment.

FIG. 29 (29A, 29B) shows fuel cell assemblies A18 and A19 according to eighteenth and nineteenth embodiments.

BEST MODES FOR CARRYING OUT THE INVENTION

FIGS. 1~4 show a fuel cell assembly (or fuel cell apparatus or fuel cell battery) A1 according to a first embodiment of the present invention. FIG. 1A is a schematic perspective view of fuel cell assembly A1, and FIG. 1B is a plan view. FIG. 2A is a sectional view taken along a diametrical line [a] shown in FIG. 2B, and FIG. 2B is a partial enlarged view. FIGS. 3A and 3B are partial enlarged views showing two examples of a heat transfer section which can be employed in fuel cell assembly A1. FIG. 4A is an exploded perspective view showing one of solid electrolyte cell units of a stack structure in fuel assembly A1. FIG. 4B is a perspective view of the stack structure.

Figure 1A:
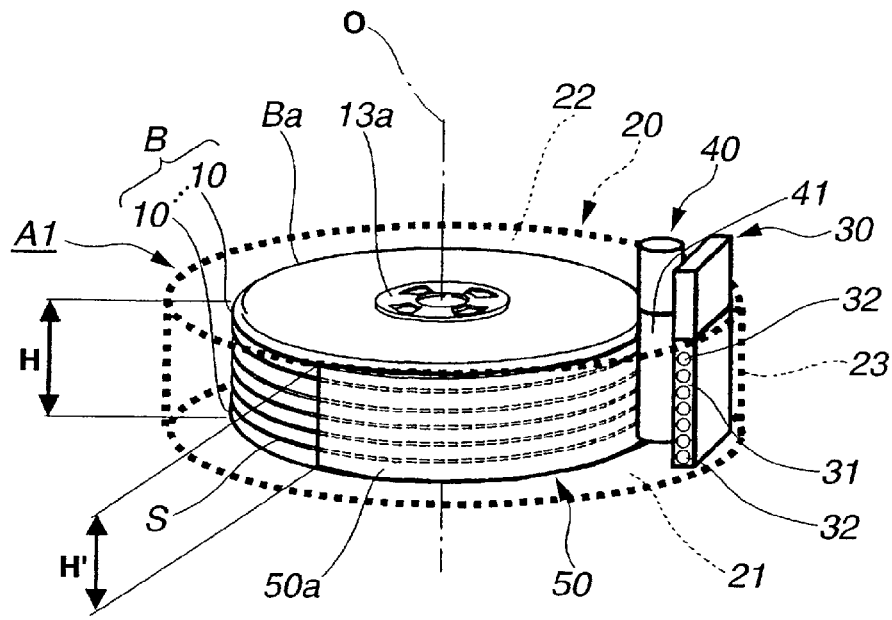
FIG. 1A(1-A) is a schematic perspective view.

As shown in FIG. 1A, fuel cell assembly A1 includes a stack structure B, a case 20 encasing stack structure B, and a gas guide disposed in case 20 as mentioned later in detail. The gas guide of this example includes at least one guide member 50.

Stack structure B includes a plurality of solid electrolyte cell units 10 (referred to simply as cell units) stacked in a column so that two adjacent cell units are spaced by an interspace [s].

Case 20 is a gastight container including a lower (bottom) wall 21, an upper wall 22, and a circumferential wall 23 surrounding stack structure B and connecting the lower and upper walls 21 and 22. In this example, stack structure B is cylindrical (substantially in the form of a right circular cylinder), the circumferential wall 23 of case 20 is cylindrical, and the lower and upper walls 21 and 22 are circular.

Fuel cell assembly A1 further includes an inlet port (or gas introduction portion) 30 for introducing a reactant gas into case 20 and an outlet port (or gas discharge portion) 40 for discharging the reactant gas from case 20. In the example shown in FIG. 1B, inlet port 30 is in the form of an inlet pipe, the outlet port 40 is in the form of an outlet pipe, and the inlet and outlet pipes 30 and 40 are pipes disposed adjacently on an imaginary diametrical (straight) line [a] passing through a center axis O of cylindrical stack structure B. The reactant gas introduced through inlet pipe 30 is a first reactant gas whereas a second reactant gas is introduced into cell units 10. In this example, the first reactant gas is air and the second reactant gas is fuel gas. However, it is optional to use the fuel gas as the first reactant gas, and air as the second reactant gas.

Case 20 is made of metallic material. In this example, case 20 is made of austenite stainless steel SUS316. Each of lower, upper and circumferential walls 21, 22 and 23 includes an inside surface coated with Ag coating layer for reflecting radiation, and an outside surface covered with a layer of heat insulating material (not shown).

Inlet pipe 30 of this example is a rectangular tubular member (shaped like a rectangular parallelepiped) having side walls 31 formed with inlet holes 32 arranged vertically in a line one above another to introduce the first reactant gas into the inside cavity of case 20. In this example, side walls 31 face in opposite directions, and inlet holes 32 of the side walls 31 are opened laterally in the opposite directions extending along a tangent to a circle around the axis O.

Outlet pipe 40 of this example is a cylindrical tubular member including a closed bottom, and a circumferential (or cylindrical) wall 41 defining an inside diameter of about 20 mm and an outside diameter of about 22 mm. The circumferential wall 41 is formed with outlet holes 42 arranged vertically in a line one above another for allowing the outgoing flow of the first reactant gas from the inside of case 20 to the outside. Each of outlet holes 42 opens toward a unique one of the interspaces [s] among the cell units 10 of stack structure B, in a radial inward direction toward the center axis O. These outlet holes 42 are arranged in conformity with the stack pitch of the cell units 10. Outlet pipe 40 stands upright in case 20, and the bottom of outlet pipe 40 is fixed to the lower wall 21 of case 20, in this example, by welding. In the example shown in FIG. 1, the inlet port (pipe) 30 and outlet port (pipe) 40 are made of the same material as case 20. However, it is possible to employ different materials for these members. In the example shown in FIG. 1, outlet pipe 40 is located radially between inlet pipe 30 and the stack structure B on the imaginary diametrical line [a].

The gas guide extends circumferentially along the cylindrical outer periphery Ba of stack structure B in case 20 to define a circumferential passage alpha to guide the reactant gas introduced from inlet port 30, around stack structure B, and includes a portion defining an open region (P) to allow the reactant gas to flow radially inwards from the circumferential passage into stack structure B. The gas guide of this embodiment further functions to guide the reactant gas through the interspaces in stack structure toward the outlet holes 42 of outlet port 40. The gas guide surrounds the stack structure B partly and divides the outer periphery Ba of stack structure B into a closed region which is covered by the gas guide and which is arranged to prevent the reactant gas from flowing into the stack structure from the circumferential passage, and the open region which is not covered by the gas guide and which is arranged to allow the reactant gas to flow into the stack structure from the circumferential passage.

The gas guide of this embodiment includes at least one guide member 50 extending around the stack structure B, from the position near inlet port 30 in case 20, and thereby defines the circumferential passage alpha between guide member 50 and circumferential wall 23 of case 20. The guide member 50 terminates at a forward (open) end to define the open region (P) to allow the reactant gas to flow from the circumferential passage (alpha) into the stack structure. The guide member 50 encircles the stack structure B partly without encircling stack structure B completely. Guide member 50 is a guide plate curved to guide the first reactant gas from the inlet pipe 30 around stack structure B. Guide member 50 includes an outside curved (convex) surface (50a) for guiding the first reactant gas circumferentially in one rotational direction around stack structure B outside the outer periphery Ba of stack structure B. The gas guide according to this embodiment includes the outside surface thus formed by the guide member, and an inside curved (concave) surface (which may be formed by guide member 50 directly or by an inside insulating layer interposed between guide member 50 and stack structure B) for guiding the first reactant gas to flow through interspaces [s] in stack structure B toward the outlet holes 42 of outlet port 40, as shown by arrows in FIG. 1B.

Figure 1B:
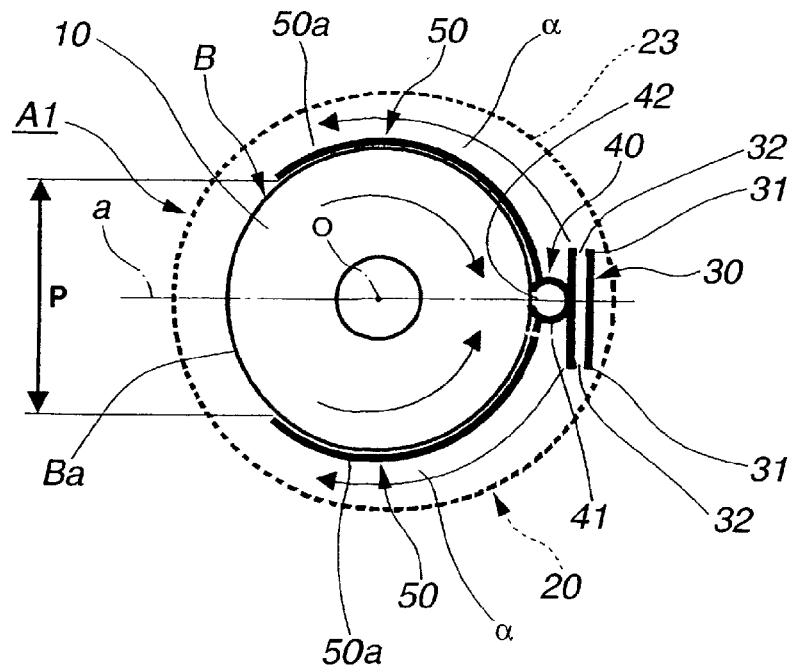
FIG. 1B(1-B) is a plan view of the fuel cell assembly A1.

In the example of FIG. 1, the gas guide includes two of the (first and second) guide members (or plates or bands) 50 each shaped like an arc of a circle around the center axis O as the center, in the plan view of FIG. 1B. The first and second guide members 50 project, like wings, from the circumferential wall 41 of outlet port 40 in two opposite rotational directions, the clockwise direction and counter clockwise direction as viewed in FIG. 1B, and terminate at respective forward (open) ends to define the open region (P) therebetween.

Each guide member 50 is a long rectangular plate or band curved in the form of an arc of a circle around the center axis O as shown in FIG. 1B. The width H-prime of each guide member 50 is approximately equal to the height H of stack structure B. The guide members 50 extend circumferentially along the outer periphery Ba of stack structure B, and divide the outer periphery Ba into the closed region covered by guide members 50 and the open region P not covered by guide members 50. In this example, the closed region is longer than the open region. More specifically, guide members 50 cover about ⅔ of the outer periphery Ba of stack structure B, and leave uncovered and open the remainder of the outer periphery Ba.

Each of guide members 50 extends from a base end adjacent to the circumferential wall 41 of outlet pipe 40 to the forward (open) end. The open region P is defined between the forward ends of guide members 50 at a position diametrically opposite to outlet pipe 30. In this example, each guide member 50 is a thin metallic plate or sheet. More specifically, each guide member 50 of this example is a thin sheet of austenite stainless steel SUS316, having a thickness of about 0.1 mm. The outer periphery Ba of stack structure B is defined by outer peripheries of cell units 10, so that the outer periphery Ba of stack structure B can be reworded as the outer peripheries of cell units 10, in this example.

In this example, gas guide has a shape symmetrical with respect to the diametrical line [a], in the manner of line symmetry in the plan view of FIG. 1B. In this example, gas inlet port 30 and outlet port 40 as well as guide members 50 are arranged in the manner of bilateral symmetry with respect to an imaginary median plane shown in the plan view of FIG. 1B by the diametrical line [a]. First and second guide members 50 form first and second circumferential passages alpha between the circumference wall 23 of case 20 and first and second guide members 50, for conveying the first reactant gas from inlet port 30 in opposite rotational directions around stack structure B. According to the first embodiment, the stack structure is located between the outlet port and the open region, the outlet port is located on a first side of the stack structure which is the right side as viewed in FIG. 1B (or the right side of a diametrical (straight) line intersecting the diametrical (straight) line [a] at the center O of the stack structure), the open region is located on a second side of the stack structure which is the left side in FIG. 1B, and the inlet port is located on the first (right) side of the stack structure.

In this example, guide members 50 are made of thermally-conductive material such as SUS316 in the form of a thin plate having a thickness of about 0.1 mm. However, it is optional to employ, as the material of guide members 50, material of non thermal conductivity or low thermal conductivity. Furthermore, instead of SUS316, it is possible to employ, as the material of guide members 50, material having good thermal conductivity, heat resistance, resistance to oxidation and resistance to reduction. For example, it is possible to employ stainless alloy containing Fe—Cr, ferrite stainless steel such as SUS430, SUS304, Crofer22APU, Ni type stainless alloy or Inconel (a registered trademark) though the material of guide members 50 is not limited to these examples. Furthermore, guide members 50 may be made of insulating material containing substance having high thermal conductivity.

Each of guide members 50 is tightly attached to outlet pipe 40 through a heat insulator (which may be referred to as outlet port insulator)(not shown) such as a ceramic sheet having a thickness of about 0.1 mm. In this example, the inlet pipe 30, outlet pipe 40, guide members 50 and lower wall 21 of case 20 are in the form of a subassembly which can be installed and removed as a unit.

The outside surface 50*a* of each guide member 50 of this example is provided with a heat transfer section or heat exchange section (which can serve as a heat exchange member) for improving the efficiency of heat exchange by increasing the contact area contacting with the first reactant gas flowing in the circumferential passages (alpha) in case 20. In the example shown in FIGS. 3A and 3B, the heat transfer section is in the form of projections (51 or 52) projecting from the outside surface 50*a* of each guide member 50 radially outwards into the circumferential passage (alpha). Thus, the gas guide according to this embodiment includes at least one guide member 50 and at least one heat transfer section (51 or 52) projecting from the guide member 50 and thereby increasing the contact area of the gas guide. The contact area is the area of a contact region which the first reactant gas can contact.

Figure 3A:
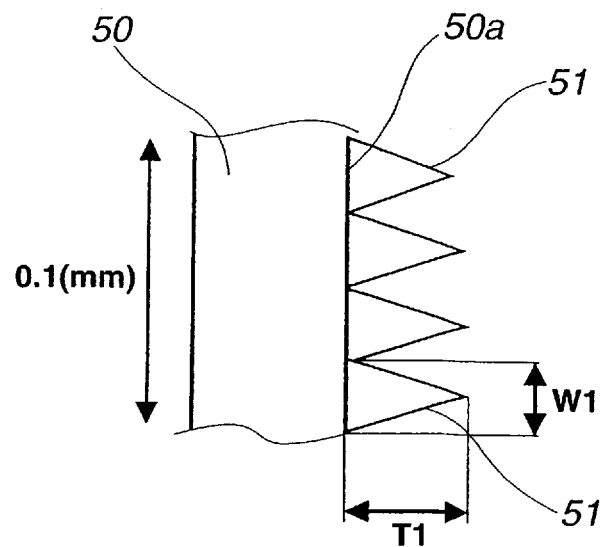
FIG. 3A(3-A) is a partial enlarged view showing a heat transfer section formed the outside surface of a guide member in the fuel cell assembly A1 of FIG. 1, in one example.

In the example shown in FIG. 3A, the heat transfer section is in the form of projections 51 or a member having projections 51. The projections are triangular projections each having a triangular cross section as shown in FIG. 3A. The triangular projections 51 extend along the flow direction of the first reactant gas in the circumferential passage, and are arranged one above another in tiers. In the example of FIG. 3A, each projection 51 is a minute projection having a width W1 of about 0.025 mm, and a length T1 of about 0.05 mm (the distance from the outside surface 50*a* to the peak of the triangular projection), and there are four of the minute projections 51 per a vertical length of 0.1 mm. Thus, the gas guide of this example has a corrugated outside surface.

Figure 3B:
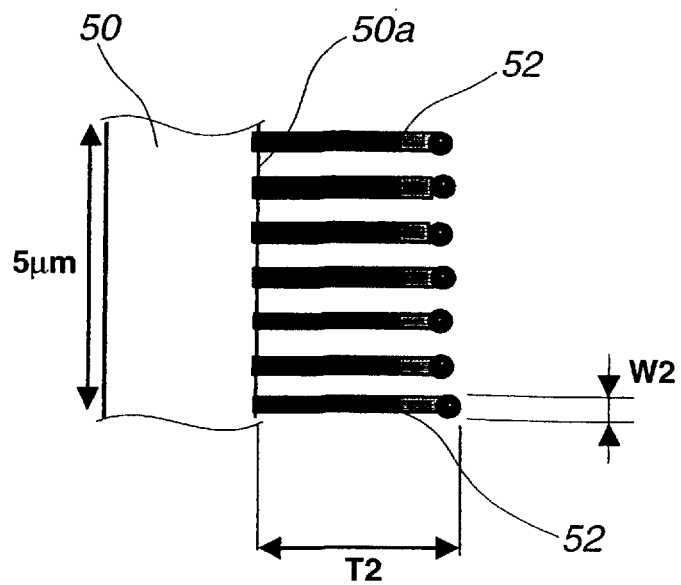
FIG. 3B(3-B) is a partial enlarged view showing the heat transfer section formed the outside surface of a guide member in the fuel cell assembly A1 of FIG. 1, in another example.

In the example shown in FIG. 3B, the heat transfer section is in the form of rectangular projections 52 which are rectangular or plate-like projections each having a long rectangular cross section as shown in FIG. 3B. The rectangular projections 52 extend along the flow direction of the first reactant gas in the circumferential passage, and are arranged one above another in tiers at regular intervals or spacing in the vertical direction. In the example of FIG. 3-B, each projection 52 is a minute projection having a width W2 of about 0.038 mu-m (micrometer), and a length T2 of about 3 mu-m, and there are seven of the minute projections 52 per a vertical length of 5 mu-m. The gas guide of this example too has the corrugated outside surface having alternating ridges and grooves.

Figure 4A:
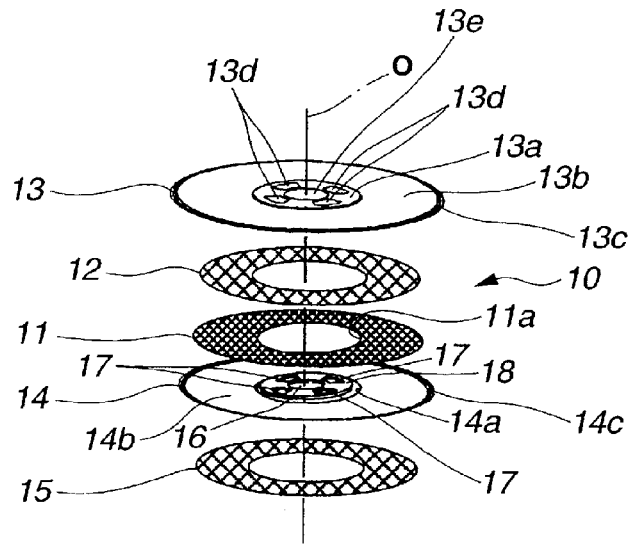
FIG. 4A(4-A) is an exploded perspective view of one solid electrolyte cell unit.
Figure 4B:
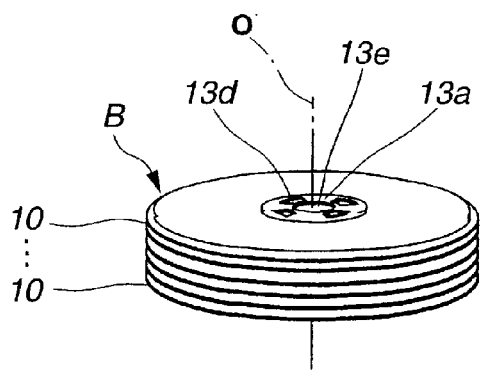
FIG. 4B(4-B) is a perspective of the stack structure of the cell units.

Stack structure B is a stack of cell units 10 stacked with interspaces [s] each formed between two adjacent cell units 10. As shown in FIG. 4A, each cell unit 10 includes a solid electrolyte cell 11, an upper layer overlying solid electrolyte cell 11 and including an inner electric collector 12 (which can serve as an inner member) and a separator (upper plate) 13, and a lower layer underlying solid electrolyte cell 11 and including a cell plate (lower plate) 14. An outer electric collector 15 (which can serve as an outer member) is disposed under cell unit 14. These components 15, 14, 11, 12 and 13 are circular or annular discs arranged coaxially about the center axis O, and piled in this order from the bottom.

Solid electrolyte cell 11 is in the form of a circular disc having a circular center hole 11*a*. For example, the electrolyte is solid acid electrolyte such as phosphate type and borate type, and/or solid oxide electrolyte such as perovskite oxide type. In this example, solid electrolyte cell 11 includes the fuel electrode of nickel+yttria stabilized zirconia cermet, the electrolyte of 8 mol % yttria stabilized zirconia, and the air electrode of lanthanum strontium manganite, and has a structure of a fuel electrode support type in which the layers of the electrolyte and air electrode are formed on the fuel electrode by sputtering.

Cell plate (lower plate) 14 of this example is made from rolled sheet of SUS430 having a thickness of about 0.1 mm. Cell plate 14 is a circular member including a (downward) circular center step portion 14*a*, an annular base portion 14*b* having the outside diameter of about 125 mm and surrounding the center step portion 14*a*, and a (upward) rim (or circumferential wall) 14*c* projecting upwards from the outer periphery of annular base portion 14*b*. The circular center step portion 14*a* projects downwards and has a height to form the interspace [s] with an adjacent cell unit 10, for allowing the flow of the first reactant gas between the cell units 10. A glass paste is applied around the central step portion 14*a*, for fixing solid electrolyte cell 11. For example, the glass paste is of BaO—CaO—Al$^2$O$^3$—SiO$^2$ type.

Separator (upper plate) 13 is made from rolled sheet of the same material as cell plate 14. Separator 13 is a circular member including a (upward) circular center step portion 13*a*, an annular base portion 13*b* having the outside diameter of about 125 mm and surrounding the center step portion 13*a*, and a (downward) rim (or circumferential wall) 13*c* projecting downwards from the outer periphery of annular base portion 13*b*. The circular center step portion 13*a* projects upwards and has a height to form the interspace [s] with an adjacent cell unit 10, for allowing the flow of the first reactant gas between the cell units 10.

Figure 2A:
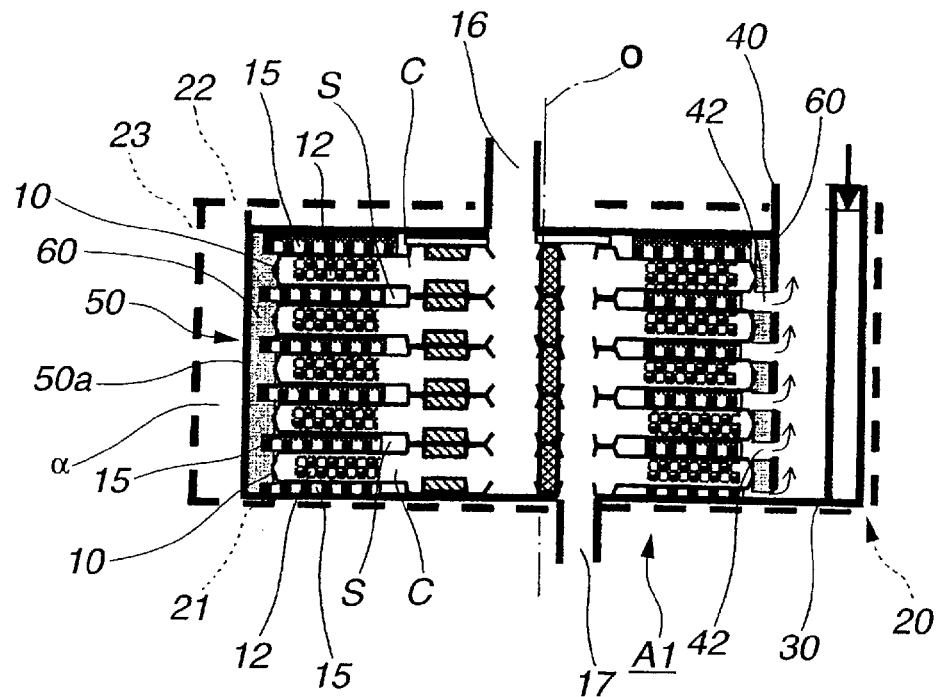
FIG. 2A(2-A) is a sectional view taken along a diametrical line [a] shown in FIG. 1B.
Figure 2B:
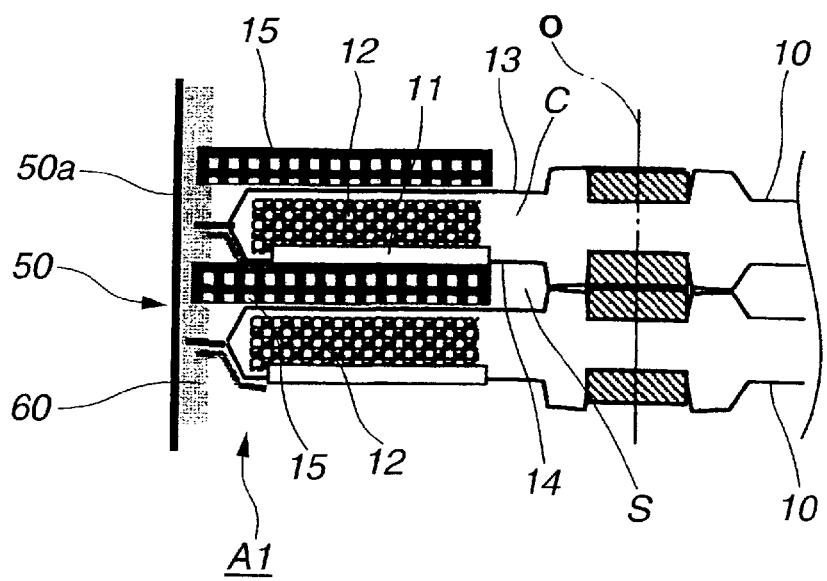
FIG. 2B(2-B) is an enlarged partial sectional view showing a part of FIG. 2A.

In the stacked state of two cell units 10, the downward center step portion 14*d* of cell plate 14 of the upper cell unit 10, and the upward center step portion 13*d* of separator 13 of the lower cell unit 10 abut on each other, and thereby define the interspace [s] between the lower and upper cell units 10, as shown in FIG. 2B.

In this example, the center step portions 14*a* and 13*a* are formed symmetrically in cell plate 14 and separator 13. This arrangement can restrain stress concentration, and improve the mechanical strength regardless of the sizes of the circular center steps 14*a* and 13*a*. In the arrangement in which a circular center step portion 14*a* or 13*a* is formed only in one of the cell plate 14 and separator 13, it is possible to increase the area for installing the solid electrolyte cell. Needless to say, it is possible to change the shapes of the cell plate 14 and separator 13 in accordance with the need, for example, to improve the resistance to thermal shock, and to improve the output density.

The circular center step portion 13*a* is provided with a passage forming member 18 including holes 13*d* and 13*e* for defining a gas introduction passage 16 for introducing the second reactant gas into the inside space [c] formed in each cell unit 10 as mentioned later and a gas discharge passage 17 for discharging the second reactant gas from the inside spaces [c]. The circular center step portion 14a is also provided with a similar passage forming member 18 including holes for defining the gas introduction and discharge passages 16 and 17. In this example, passage forming members 18 are made of SUS430, and fixed, respectively, to the circular center step portions 14a and 13a of cell plate 14 and separator 13 by diffusion joining in vacuum at a joining temperature lower than or equal to 1000 degrees (C.).

Inner collector 12 is an annular member formed from metal mesh of Inconel (registered trademark). In this example, the outer peripheral portion of inner collector 12 is joined to cell plate 14 and separator 13 by laser welding.

The ribs (circumferential walls) 14c and 13c of cell plate 14 and separator 13 abut on each other, and thereby form the inside space [c] between cell plate 14 and separator 13, for serving as a gas passage. Inner collector 12 is disposed in the inside space [c]. The ribs 14c and 13c in the abutting state are joined together by laser welding over the entire circumference (gastightly). In this way, cell plate 14 and separator 13 form one cell unit 10 having a thickness of about 1.5 mm. Cell plate 14 and separator 13 can serve as a frame member or a frame of each unit cell.

The cell plate 14 and separator 13 are formed by press forming by applying a load of about 80 t to the above-mentioned rolled sheet with a press machine (not shown) with dies of material such as superhard material or SKD11.

An inside insulating layer 60 is provided between stack structure B and each of the guide members 50, as shown in FIGS. 2A and 2B. The inside insulating layer 60 is made of insulating material having electrical insulating properties and thermal conductivity to serve as an electrical insulator and a thermal conductor. Thus, in addition to at least one guide member 50, the gas guide according to this embodiment includes the inside insulating layer 60 interposed between the guide member 50 and stack structure B. In the example shown in FIG. 2, the inside insulating member 60 is a member made of glass coat, glass wool or ceramic sheet or a layer formed by filling ceramic material in a space between the guide member 50 and the stack structure (outer collector 15, specifically). In this example, the outer collector 15 is tightly attached to guide member 50 through the inside insulating layer 60. Inside insulating layer 60 may be fixed to either or both of the guide member 50 and stack structure, or may be supported otherwise.

In this example, the outer collector 15 and cell unit 10 are attached tightly through inside insulating layer 60 to guide member 50. However, it is optional to attach cell unit 10 or outer collector 15 through the inside insulating layer 60 to guide member 50. It is desirable to decrease the thickness of inside insulating layer 60 as much as possible.

Instead of the above-mentioned glass coat etc., the material of inside insulating layer 60 may be material such as castable refractory, portland cement, alumina cement, phosphate cement, silicate cement, or other refractory foam cement; material such as refractory mortar, plaster, ceramic adhesive, foamed glass and other castable (or monolithic) material; or fibrous material such as glass fiber and ceramic fiber.

The (thermally conductive) insulating layer (60) interposed tightly between the outer periphery of stack structure B and each of outlet pipe 40 and guide members 50 is effective for improving the efficiency of heat transfer to guide members 50 from the thermal conductive components in stack structure B such as outer collectors 15, separators 13, cell plates 14 and inner collectors 12. Moreover, this arrangement can restrain deformation of cell units 10 due to vibrations and heat distribution, reduce the possibility of one-sided abutment of outer collectors 15, and improve the electric generating performance to higher and more stable output.

The thus-constructed fuel cell assembly A1 can be produced in the following manner. First, the stack structure B is formed by stacking the cell units 10 sequentially by applying ceramic adhesive containing, as a main component, $Al_2O^3$, to the central portion of cell unit 10 in the form of two rings, and superposing the cell unit 10 on another to form the interspace [s] of 1.5 mm.

Second, the guide members 50 are set closely to the outer periphery Ba of stack structure B through the inside insulating layer 60, and the guide member 50 and outlet pipe 40 are fixed to stack structure B by using fastening devices (not shown) such as bolts, for example.

Third, the stacked cell units 10 are placed between upper and lower flanges, and clamped into the firm stack by stud bolts and nuts (not shown).

As the joining or cementing material, it is possible to use glass type adhesive, gasket formed by adding ceramic fiber and filler to glass. Furthermore, when the solid electrolyte cells 11 are in the form of a circular disc as mentioned before, it is possible to use, an adhesive containing metallic powder formed like paste, brazing filler metal formed like a gasket, and metallic gasket.

In the thus-constructed fuel cell assembly A1 according to the first embodiment, the first reactant gas flows in the following manner. The first reactant gas introduced into case 20 through inlet pipe 30 flows circumferentially along the outer side of each guide member 50 through each of the circumferential passages alpha toward the forward (open) end of each guide member 50. At the forward (open) end of each guide member, the first reactant gas turns toward stack structure B, and flows radially inwards into stack structure through the open region (P) between the confronting forward ends of first and second guide members 50. Then, the first reactant gas flows through the interspaces [s] in stack structure B toward outlet pipe 40, flows into outlet pipe 40 through the vertical row of outlet holes 42, and is discharged through outlet pipe 40 to the outside of case 20.

The thus-constructed fuel cell assembly A1 is operated as follows:

<High Load Operation> Each guide member 50 extends around the stack structure so as to form a circular arc having a central angle greater than 90 degrees at the center axis O of stack structure, and thereby guide the first reactant gas circumferentially around stack structure B through the relatively long circumferential passage extending over a circular sector subtending an obtuse central angle at the center (O). By causing the reactant gas to flow around stack structure, the guide members 50 can function to cool the gas discharge side of stack structure B, to warm the reactant gas flowing in the circumferential passages, and to allow the warmed reactant gas to flow through the interspaces [s] in stack structure B toward outlet pipe 40. Therefore, heat produced in stack structure B is conveyed by the reactant gas, and the hot region where the gas becomes hot in the surface of each cell unit 10 on the above-mentioned gas discharge side is cooled from the outer periphery Ba of stack structure B by guide members 50. Therefore, this fuel cell assembly can make uniform the temperature distribution in each solid electrolyte cell unit 10 over the plane of cell unit 10, and decrease the temperature difference produced in the stack structure.

<Low Load Operation> By causing the reactant gas to flow around stack structure, the guide members 50 can function to warm the gas discharge side of stack structure B, to cool the reactant gas flowing in the circumferential passages, and to allow the cooled reactant gas to flow through the interspaces [s] in stack structure B toward outlet pipe 40. Therefore, when the heat produced in stack structure B exceeds the heat released to the outside of stack structure B, the guide members 50 function to warm the stack structure B from the outer periphery Ba to increase or hold the temperature of stack structure B. Therefore, this fuel cell assembly can make uniform the temperature distribution in each solid electrolyte cell unit 10 over the plane of the cell unit 10, and decrease the temperature difference produced in the stack structure.

In the following, various other embodiments of the present invention are explained by using the same reference numerals for substantially identical parts and directing the explanation mainly to differences from the first embodiment without repeating redundant explanation.

Figure 5:
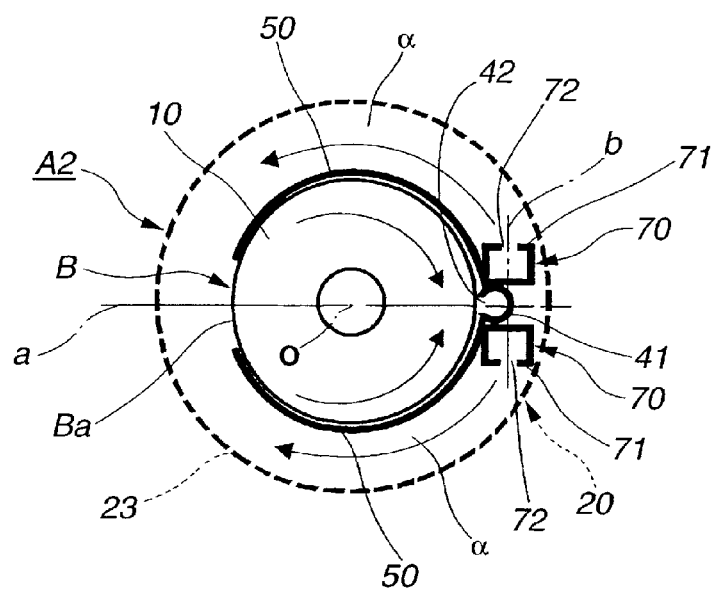
FIG. 5 is a plan view showing a fuel cell assembly A2 according to a second embodiment.

FIG. 5 shows a fuel cell assembly A2 according to a second embodiment of the present invention, in the form of a plan view. Fuel cell assembly A2 is different from fuel cell assembly A1 of the first embodiment only in the gas inlet port. In other respects, fuel cell assembly A2 is substantially identical to fuel cell assembly A1.

The inlet port shown in FIG. 5 is composed of two inlet pipes 70 disposed on both sides of the outlet pipe 40. Outlet pipe 40 is disposed on the diametrical line [a] as in the first embodiment, and inlet pipes 70 are disposed on a tangential straight line [b] perpendicular to the diametrical line [a], on both sides of outlet pipe 40. Outlet pipe 40 is disposed contiguously between inlet pipes 70 in the circumferential direction around stack structure B. In the example of FIG. 5, inlet pipes 70 (as well as outlet pipe 40 and guide members 50) are arranged symmetrically in the manner of bilateral symmetry with respect to the imaginary median plane shown by diametrical line [a] in the plan view of FIG. 5. Each of inlet pipes 70 is a rectangular tubular member having a rectangular cross section as shown in FIG. 5, and includes an inner side wall which faces toward outlet pipe 40 and which is put in contact with the circumferential wall 41 of outlet pipe 40, and an outer side wall 71 which faces away from outlet pipe 40 and which is formed with inlet holes 72 arranged vertically in tiers to introduce the first reactant gas into case 20. The thus-constructed fuel cell assembly A2 can provide the same effects and advantages as in the first embodiment.

Figure 6:
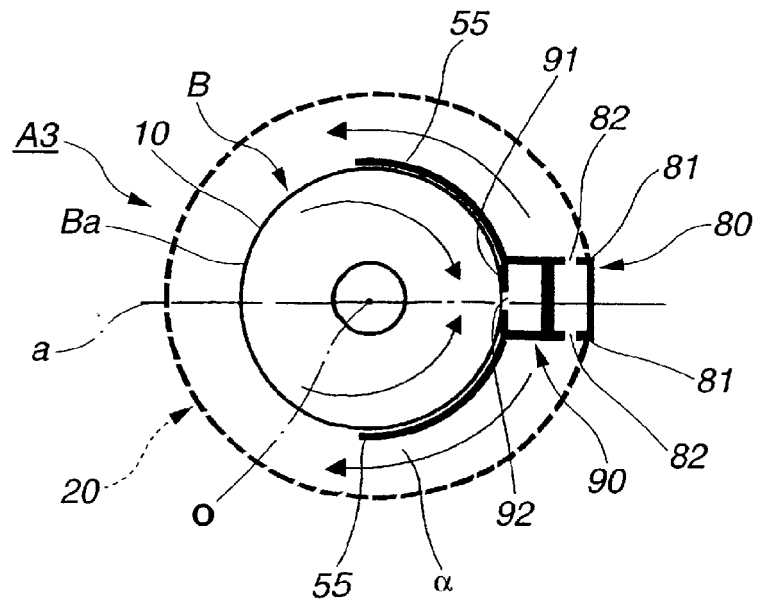
FIG. 6 is a plan view showing a fuel cell assembly A3 according to a third embodiment.

FIG. 6 shows a fuel cell assembly A3 according to a third embodiment of the present invention, in the form of a plan view. Fuel cell assembly A3 is different from fuel cell assembly A1 of the first embodiment in the gas inlet port and the length of the guide members. In other respects, fuel cell assembly A3 is substantially identical to fuel cell assembly A1.

As shown in FIG. 6, inlet pipe 80 is rectangular in cross section, and includes two opposite side walls 81. Inlet holes 82 are arranged in tiers in each side wall 81 to introduce the first reactant gas into case 20. Outlet pipe 90 is also rectangular in cross section, and includes an inner wall 92 facing toward the center axis O of stack structure B. Outlet holes 92 are opened in this inner wall 92 to discharge the first reactant gas out of case 20. Outlet holes 92 are arranged in tiers so that each outlet hole 92 confronts one of the interspaces [s] in stack structure B.

Each of guide members 55 shown in FIG. 6 is a long rectangular plate or band which has a width approximately equal to the height of stack structure B and which is curved in the form of an arc of a circle around the center axis O, like the guide members 50. However, guide members 55 are shorter than guide members 50 of the preceding embodiments. Guide members 55 cover about half of the outer periphery Ba of stack structure B. Preferably, guide members 55 covers more than half of the outer periphery Ba of stack structure. Thus, preferably, guide members 55 of the gas guide (together with outlet pipe 90) divide the outer periphery Ba into the closed region extending through an angle greater than 180 degrees, and the open region extending through an angle smaller than 180 degrees around the center axis O. As shown in FIG. 6, the outlet pipe 90 is disposed radially between inlet pipe 80 and stack structure B, and the inlet and outlet pipes 80 and 90 (and guide members 55) are arranged symmetrically with respect to the median plane ([a]). The thus-constructed fuel cell assembly A3 can provide the same effects and advantages as in the preceding embodiments.

Figure 7A:
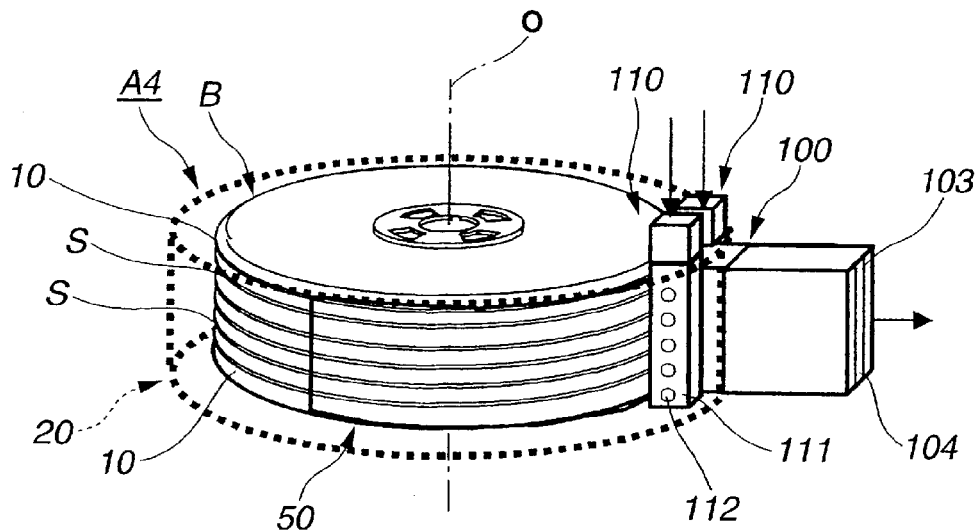
FIG. 7A(7-A) is a schematic perspective view.
Figure 7B:
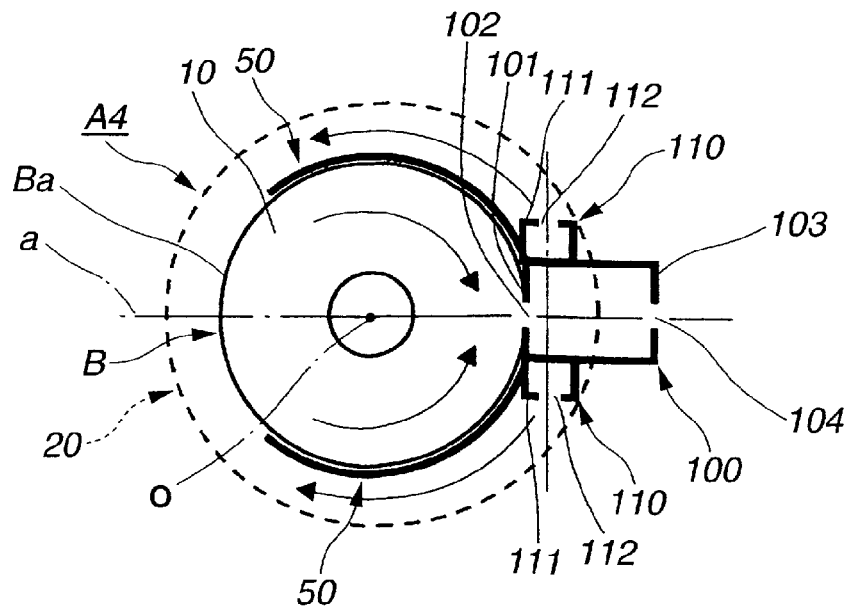
FIG. 7B(7-B) is a plan view.

FIG. 7 shows a fuel cell assembly A4 according to a fourth embodiment, schematically in a perspective in FIG. 7A, and in plan in FIG. 7B. Fuel cell assembly A4 is different from fuel cell assembly A1 of the first embodiment in the gas inlet and outlet ports. In other respects, fuel cell assembly A4 is substantially identical to fuel cell assembly A1 of the first embodiment.

As shown in FIGS. 7A and 7B, an outlet pipe 100 is disposed circumferentially between two inlet pipes 110. Outlet and inlet pipes 100 and 110 are arranged in a line along the tangential (straight) line [b] perpendicular to the diametrical line [a].

Each of the two inlet pipes 110 is a rectangular tubular member having a rectangular cross section as shown in FIG. 7B, and includes an inner side wall contagious with outlet pipe 100, and an outer side wall 111 formed with a vertical row of inlet holes 112 for introducing the first reactant gas into case 20.

Outlet pipe 100 is a large rectangular tubular member having a rectangular cross section greater than the inlet pipes 110. Outlet pipe 100 includes an inner wall 101 facing radially inwards toward the center axis O of stack structure B and an outer wall 103 facing radially outwards away from stack structure B. Inner wall 101 facing radially inwards is formed with a vertical row of outlet holes 102 each confronting one of the interspaces [s] of stack structure B. Outer wall 103 facing radially outwards is formed with at least one discharge hole 104. The first reactant gas in stack structure B is taken into outlet pipe 100 through outlet holes 102, and then discharged through discharge hole 104 to the outside. Thus, the first reactant gas is discharged in a radial outward direction unlike fuel cell assembly A1. In this example shown in FIG. 7, outlet pipe 100 projects out of the case 20, and the outer wall 103 is located outside case 20. The thus-constructed fuel cell assembly A4 can provide the effects and advantages as in the preceding embodiments.

Figure 8A:
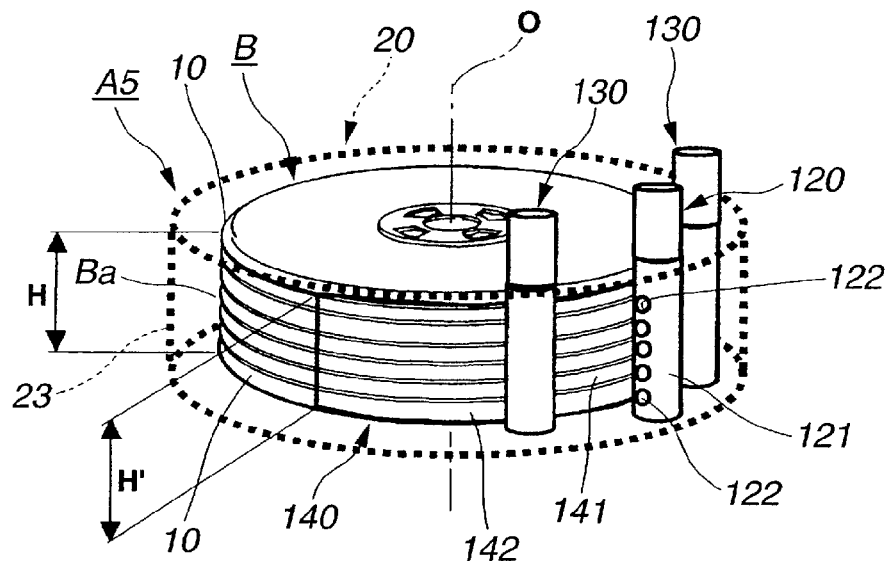
FIG. 8A(8-A) is a schematic perspective view.
Figure 8B:
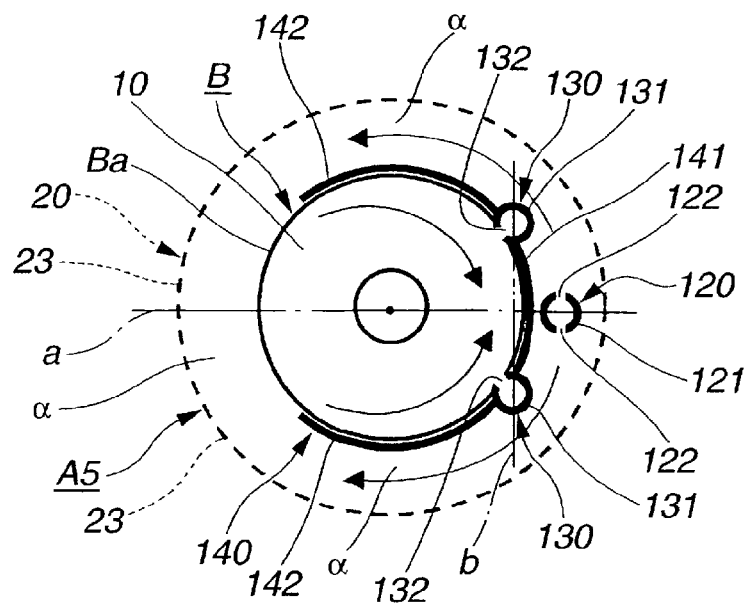
FIG. 8B(8-B) is a plan view.

FIG. 8 shows a fuel cell assembly A5 according to a fifth embodiment, in a schematic perspective view of FIG. 8A, and a plan view of FIG. 8B. Fuel cell assembly A5 is different from fuel cell assembly A1 of the first embodiment in the gas inlet and outlet ports. In other respects, fuel cell assembly A5 is substantially identical to fuel cell assembly A1 of the first embodiment.

As shown in FIGS. 8A and 8B, an inlet pipe 120, and two (first and second) outlet pipes 130 are separated from one another, and the gas guide is arranged to cover a part of the outer periphery Ba in conformity with the separate arrangement. The two outlet pipes 130 are spaced from each other along a tangential (straight) line [b] perpendicular to the diametrical line [a] passing through center axis O of stack structure B, on both sides of the diametrical line [a]. In the example shown in FIG. 8, outlet pipes 130 are symmetrical in the manner of bilateral symmetry with respect to the median plane ([a]), and the inlet pipe 120 and the gas guide are also symmetrical with respect to the median plane ([a]).

Inlet pipe 120 is cylindrical, and includes a cylindrical circumferential wall 121 formed with two vertical rows of inlet holes 122 at two diametrically opposite positions to introduce the first reactant gas into case 20 so as to produce two opposite circumferential flows as shown by arrows in FIG. 8B.

Each of outlet pipes 130 is cylindrical, and includes a cylindrical circumferential wall 131 formed with a vertical row of outlet holes 132 each opening radially inwards toward one of the interspaces [s] in stack structure B to discharge the first reactant gas out of case 20.

The gas guide includes a guide structure 140 which includes: an intermediate guide member (connecting portion) 141 extending circumferentially between the two separate outlet pipes 130 and connecting the two separate outlet pipes 130; and first and second guide members 142 (or extension portions) projecting circumferentially from the two outlet pipes 130, respectively. Each of the guide members 141 and 142 has a width H-prime approximately equal to the height H of stack structure B, and the guide structure 140 composed of these guide members 141 and 142 covers about two thirds of the outer periphery Ba of stack structure B in the form of a circular arc around stack structure B. In this example, the guide structure 140 as well as outlet pipes 130 is symmetrical with respect to the imaginary median plane ([a]) as shown in FIG. 8B. Guide structure 140 defines circumferential passages (alpha) between the circumferential wall 23 of case and guide structure 140. First and second guide members 142 extend, from the outlet port composed of the two separate (first and second) outlet pipes 130, in opposite rotational directions around the stack structure, and terminating at respective forward ends between which the open region is defined. The guide members 141 and 142 may be portions of a single plate or band, or may be three separate members connected through outlet pipes 130. In this example, intermediate guide member 141 is located radially between inlet pipe 120 and stack structure B, and extends circumferentially from a first end connected with the first outlet pipe 130 to a second end connected with the second outlet pipe 130. Each of first and second guide members 142 extends circumferentially from a base end connected with the first or second outlet pipe 130 to the forward end defining the open region.

Figure 9A:
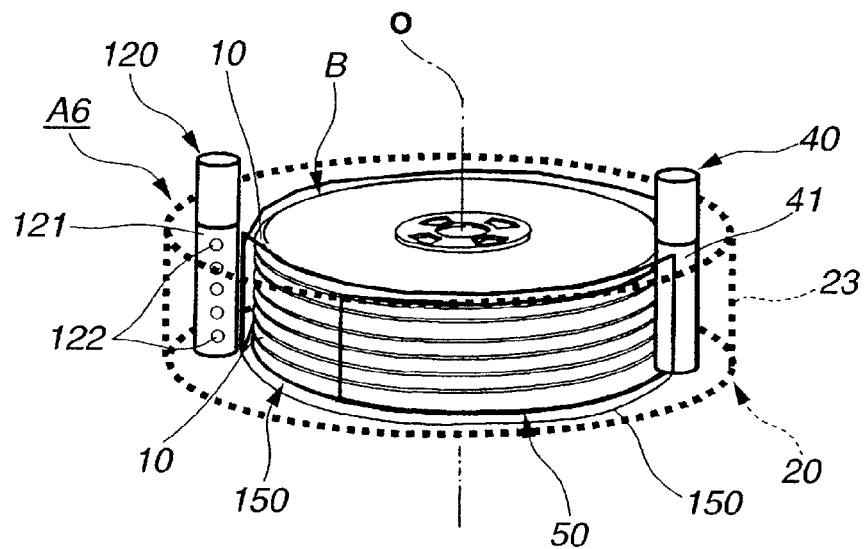
FIG. 9A(9-A) is a schematic perspective view.

FIG. 9 shows a fuel cell assembly A6 according to a sixth embodiment, in a schematic perspective view of FIG. 9A and a plan view of FIG. 9A. The fuel cell assembly A6 is different in the position of the inlet port and the structure of the gas guide, from fuel cell assembly A1 of FIG. 1. The inlet port includes an inlet pipe 120 disposed at a position diametrically opposite to the position of the outlet port 40 across stack structure B on the diametrical line [a] passing through the center O of stack structure B. Inlet pipe 120 is located near the circumferential wall 23 of case 20 whereas outlet pipe 40 is located adjacent to the outer periphery Ba of stack structure B. In the example shown in FIG. 9, the structure of inlet pipe 120 is substantially identical to inlet pipe 120 shown in FIG. 8 of the fifth embodiment.

In addition to the first and second guide members 50, the gas guide includes an outer guide member 150 (which can serve as an outer deflector). The first and second guide members 50 are substantially identical to guide members 50 shown in FIG. 1 of the first embodiment. First and second guide members 50 are located on the radial inner side of the outer guide member 150, so that first and second guide members 50 can be named as inner guide members.

Outer guide member 150 is a long rectangular plate or band which is curved in the form of an arc of a circle having the center at the center axis O of stack structure B, and which has a width H-prime approximately equal to the height H of stack structure B, like guide members 50 as shown in FIG. 1, and a circumferential length covering about ⅔ of the outer periphery Ba of stack structure B. In the example shown in FIG. 9, the outer guide member 150 is symmetrical with respect to the median plane ([a]). Furthermore, the gas guide including the first and second guide members 50 and outer guide member 150 and the inlet and outlet ports are arranged symmetrically with respect to the median plane ([a]).

Figure 9B:
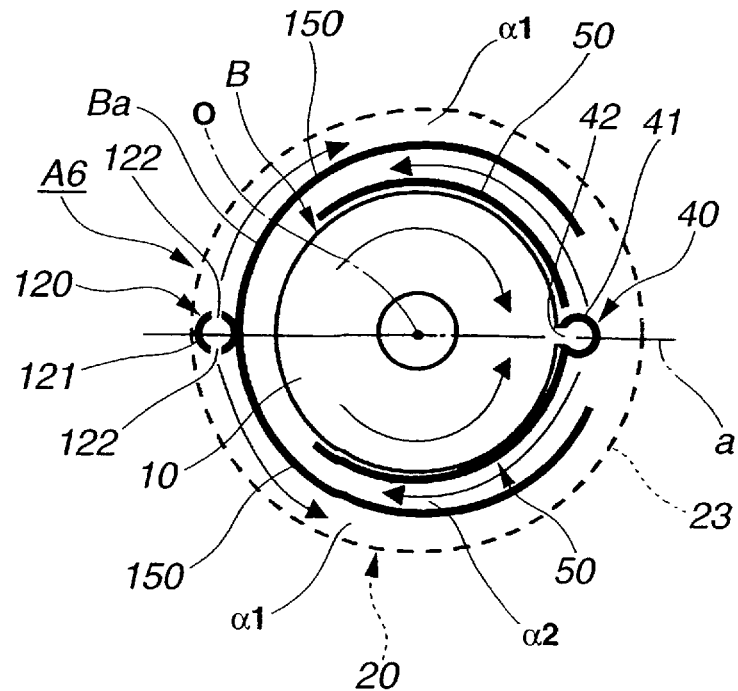
FIG. 9B(9-B) is a plan view.

Inlet pipe 120 is disposed tightly between the middle of outer guide member 150 and circumferential wall 23 of case 20. Outer guide member 150 includes first and second arc portions extending in two opposite direction from the middle of outer guide member 150 and defines outer circumferential passages alpha-1 extending from inlet pipe 120 in two opposite circumferential directions. The first vertical row of inlet holes 122 open into one of the outer circumferential passages and the second row of inlet holes 122 open into the other. The first and second arc portions of outer guide member 150 further define first and second inner circumferential passages alpha-2 between the first and second inner guide members 50 and the first and second arc portions of outer guide member 150. Between both ends of outer guide member 150, there is formed an outer opening or outer open region arranged to allow the first reactant gas to flow from the outer circumferential passages alpha-1 to the inner circumferential passage alpha-2. This outer open region is located at a position diametrically opposite to the position of the (inner) open region formed between the forward ends of first and second (inner) guide members 50, as shown in FIG. 9B. This guide structure including inner and outer (concentric) guide members 50 and 150 functions to increase the length of fluid passage of the first reactant gas, and thereby to improve the efficiency of heat exchange.

The first reactant gas introduced into case 20 through inlet pipe 120 on the inlet side (the left side as viewed in FIG. 9B) of stack structure B flows along the first and second portions of outer guide member 150 in first and second outer circumferential passages alpha-1 formed between the convex outside surface of outer guide member 150 and the concave inside surface of circumferential wall 23 of case 20, until the outer open region formed between the ends of outer guide member 150 at the position diametrically opposite to the position of inlet pipe 120 on the outlet side (the right side as viewed in FIG. 9B) of stack structure B.

At the outer open region, the first reactant gas turns the flow direction and flows through the outer open region into inner circumferential passages alpha-2 formed between the concave inside surface of outer guide member and the convex outside surfaces of inner guide members 50, and flows circumferentially to the inner open region formed between the forward ends of inner guide members 50 on the inlet (left) side of stack structure B. Then, through the inner open region, the first reactant gas turns into stack structure B, flows through the interspaces [s] in stack structure toward outlet pipe 40 on the outlet (right) side, and flows out of case 20 through outlet pipe 40. In the preceding embodiment, the outlet port is located on a first side of the stack structure, the open region is located on a second side of the stack structure, the stack structure is located between the outlet port and the open region, and the inlet port is located on the first side of the stack structure. In the sixth embodiment, by contrast, the outlet port is located on a first (right in FIG. 9B) side of the stack structure, the open region is located on a second (left)

side of the stack structure, the stack structure is located between the outlet port and the open region, the inlet port is located on the second side of the stack structure and the outer opening is located on the first side of the stack structure.

Figure 10:
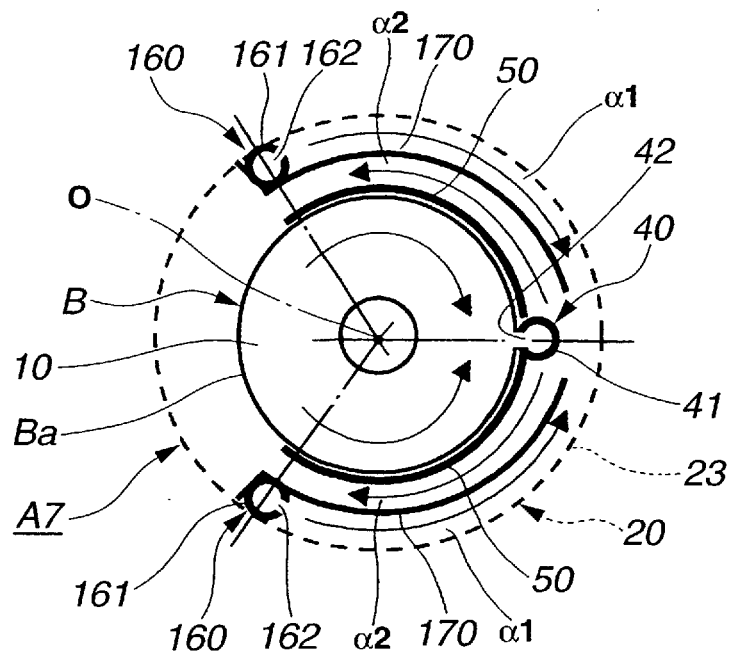
FIG. 10 is a plan view showing a fuel cell assembly A7 according to a seventh embodiment.

FIG. 10 shows a fuel cell assembly A7 according to a seventh embodiment in a plan view. Fuel cell assembly A7 is different in the position and structure of the inlet port and the structure of the gas guide, from fuel cell assembly A1 of FIG. 1. In the fuel cell assembly A7, two (first and second) inlet pipes 160 and one outlet pipe 40 are positioned at three points arranged around the center axis O of stack structure at regular angular intervals of 120 degrees. Moreover, the gas guide includes two (first and second) outer guide members 170 (which can serve as the outer deflector). Each of inlet pipes 160 of this example is cylindrical and includes a cylindrical circumferential wall formed with a vertical row of inlet holes 162 for introducing the first reactant gas into case 20. Each inlet pipe 160 is located near the circumferential wall 23 of case 20 whereas outlet pipe 40 is located adjacent to the outer periphery Ba of stack structure B.

In addition to the first and second guide members 50, the gas guide includes the first and second outer guide member 170. The first and second guide members 50 are substantially identical to guide members 50 shown in FIG. 1. First and second guide members 50 are located on the radial inner side of the outer guide members 170.

Each of outer guide members 170 is a long rectangular plate or band which is curved in the form of an arc of a circle having the center at the center axis O of stack structure B, and which has a width H-prime approximately equal to the height H of stack structure B, like guide members 50 as shown in FIG. 1, and a circumferential length covering about ⅓ of the outer periphery Ba of stack structure B. In the example shown in FIG. 10, the first and second outer guide members 170 and the first and second inlet pipes 160 are symmetrical with respect to the median plane ([a]). Furthermore, the entire guide structure including the first and second guide members 50 and outer guide member 170 and the inlet and outlet ports is symmetrically with respect to the median plane ([a]) as shown in FIG. 10.

Each of first and second outer guide members 170 extends circumferentially from a base end fixed to the circumferential wall 161 of a corresponding one of first and second inlet pipes 160 so as to form a closed end with the inlet pipe 160, to a forward (open) end located near outlet pipe 40. Thus, by extending like a circular arc, each of the first and second outer guide members 170 defines an (first or second) outer circumferential passage alpha-1 between the concave inside surface of circumferential wall 23 of case 20 and the convex outside surface of the outer guide member 170 on the radial outer side, and an (first or second) inner circumferential passage alpha-2 formed between the concave inside surface of the outer guide member 170 and the convex outside surface of the first or second inner guide member 50. The outer opening or outer open region is formed between the forward ends of first and second outer guide members 170 at a position on a first (left) side of stack structure B, and the inner open region is formed between the forwards ends of first and second inner guide members 50 at the position diametrically opposite to the position of the outer open region on a second side of stack structure B which is the right side as viewed in FIG. 10 and opposite to the first (left) side. The thus-constructed gas guide structure can increase the length of flow path of the first reactant gas in case 20, and thereby improve the heat exchange efficiency, like the gas guide structure of the sixth embodiment shown in FIG. 9.

The first reactant gas introduced into case 20 through inlet pipes 160 flows along first and second outer guide members 170 in first and second outer circumferential passages alpha-1, toward the outer open region formed between the forward ends of outer guide members 170. At the outer open region, the first reactant gas turns the flow direction and flows through the outer open region into inner circumferential passages alpha-2, and flows circumferentially toward the inner open region formed between the forward ends of inner guide members 50. Then, through the inner open region, the first reactant gas turns into stack structure B, flows through the interspaces [s] in stack structure toward outlet pipe 40, and flows out of case 20 through outlet pipe 40.

Figure 11A:
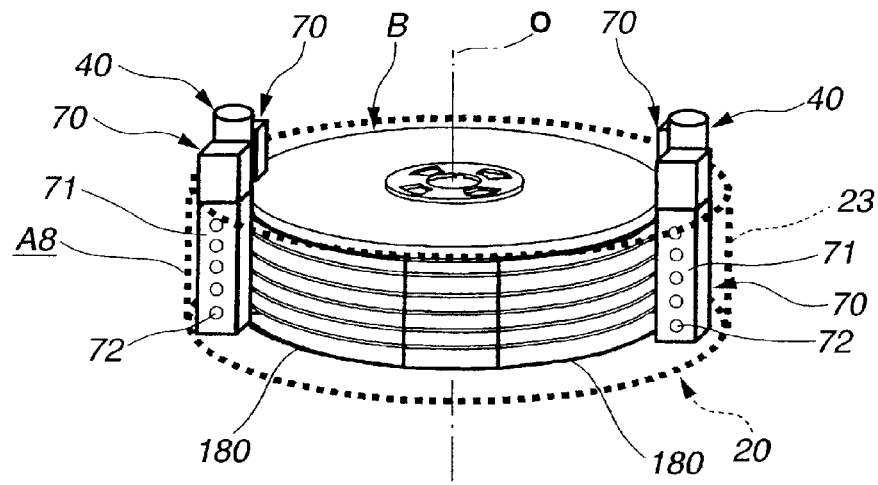
FIG. 11A(11-A) is a schematic perspective view.
Figure 11B:
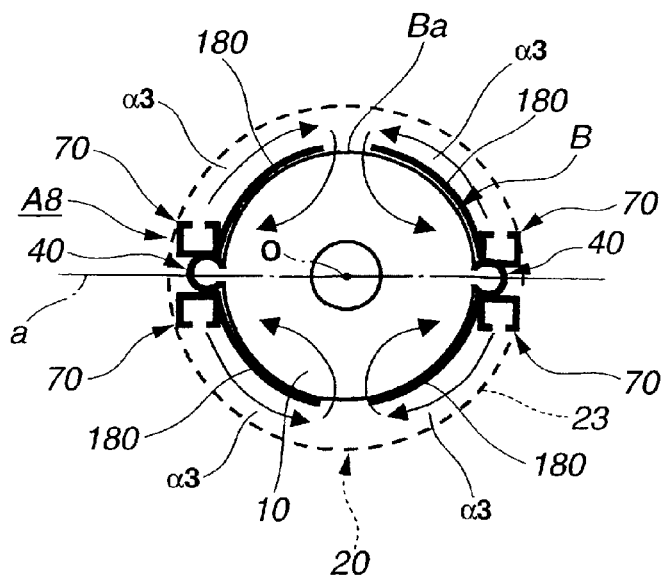
FIG. 11B(11-B) is a plan view.

FIG. 11 shows a fuel cell assembly A8 according to an eighth embodiment in a schematic perspective of FIG. 11A and a plan of FIG. 11B. Unlike fuel cell assembly A1 of FIG. 1, the fuel cell assembly A8 of FIG. 11 includes a plurality of sets each including at least one inlet pipe, at least one outlet pipe and at least one guide member. The sets are arranged around the stack structure B. In the example shown in FIG. 11, there are provided two (first and second) sets each including two inlet pipes 70 (similar to inlet pipes 70 of FIG. 5), one outlet pipe 40 and two guide members 180, and the first and second sets are arranged at diametrically opposite positions across stack structure B.

Each of guide members 180 is a long rectangular plate or band which is curved in the form of an arc of a circle having the center at the center axis O of stack structure B, and which has a width H-prime approximately equal to the height H of stack structure B, like guide members 50 as shown in FIG. 1, and a circumferential length slightly shorter than a length covering about ½ of the outer periphery Ba of stack structure B. As shown in the plan view of FIG. 11B, the first and second sets are symmetrical with respect to a first diametrical (straight) line [a] passing through the center O of stack structure B, and further symmetrical with respect to a second diametrical (straight) line passing through the center O and intersecting the first diametrical line [a] at right angles. Guide members 180 define four circumferential passages alpha-3 each formed between one guide member 180 and the inside surface of circumferential wall 23 of case 20. Each guide member 180 extends circumferentially from one of outlet pipes 40, like a quadrant (a circular arc of 90 degrees), to a forward end. Two open regions are formed at two diametrically opposite position along the second diametrical line. Each open region is defined between the confronting forward ends of one guide member 180 of the first set and one guide member 180 of the second set.

The first reactant gas is introduced into case 20 from four inlet pipes 70, and guided by four guide members 180 along the circumferential passages alpha-3 toward the open regions, as shown by arrows in FIG. 11B. At each open region, the first reactant gas turns its flow direction, and enters the stack structure B. In stack structure, the first reactant gas flows through interspaces [s] toward one of outlet pipes 40, and flows out of case 20 through outlet pipes 40. The thus-constructed fuel cell assembly can provide the same effects and advantages as in the first embodiment.

Figure 12A:
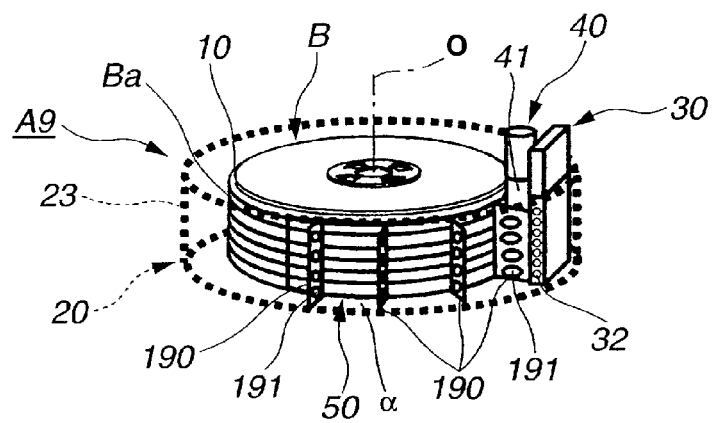
FIG. 12A(12-A) is a schematic perspective view.
Figure 12B:
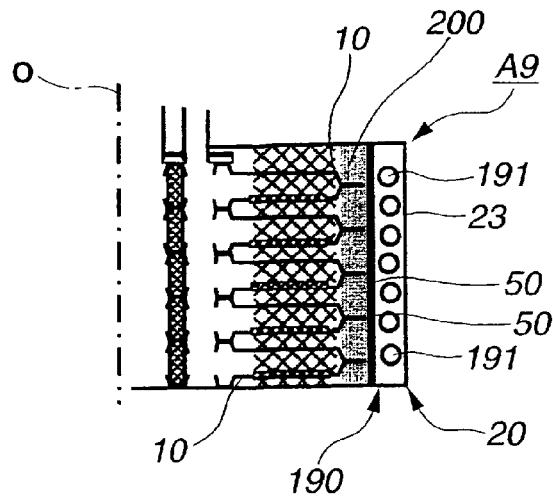
FIG. 12B(12-B) is a partial sectional view.

FIG. 12 shows a fuel cell assembly A9 according to a ninth embodiment in perspective in FIG. 12A and in section in FIG. 12B. In this embodiment, the gas guide comprises an outside heat transfer section (190) for improving the heat exchanging efficiency. In the example shown in FIG. 12, the heat transfer section is in the form of a plurality of radial fins 190 projecting radially outwards from the outside surface of each guide member 50. Radial fins 190 are arranged radially around the center axis O at angular intervals. In the example of FIG. 12, four of the radial fins 190 are fixed to each of the guide members 50.

Each of radial fins 190 is in the form of an upright rectangular plate having a height equal to the height H-prime of guide members 50, and a width equal to a radial distance between the outside surface of each guide member 50 and the inside surface of circumferential wall 23 of case 20. Each radial fin 190 is formed with gas communication holes 191 through which the first reactant gas can flow in the circumferential passage. In this example, the communication holes 191 are circular holes arranged vertically in a vertical row. Each of (perforated) radial fins 191 includes two opposite surfaces extending radially and facing circumferentially (or tangentially). With these perforated radial fins, the fuel cell assembly A9 can improve the efficiency of the heat exchange between the first reactant gas in the circumferential passage and the stack structure B.

An inside insulating layer 200 is provided between stack structure B and each of the guide members 50, as shown in FIG. 12B. The inside insulating layer 200 is made of insulating material having electrical insulating properties and thermal conductivity to serve as an electrical insulator and a thermal conductor, like inside insulating layer 60 shown in FIG. 2. Thus, in addition to at least one guide member 50, the gas guide according to this embodiment includes the inside insulating layer 200 interposed between the guide member 50 and stack structure B. Inside insulating layer 200 is formed by filling insulating material such as ceramic material as mentioned before, in the space between stack structure B and each guide member 50. Inside insulating layer 200 is tightly and contiguously interposed between each cell unit 10 and the guide member 50.

The first reactant gas introduced into case 20 from inlet pipe 30 flows in the circumferential passages along guide members 50 through communication holes 191 of radial fins 190, toward the open region. Then, the first reactant gas flows into stack structure B through the open region, flows to outlet pipe 40 through interspaces [s], and flows out of case 20 through outlet pipe 40. The thus-constructed fuel cell assembly can provide the same effects and advantages as in the first embodiment.

Figure 13:
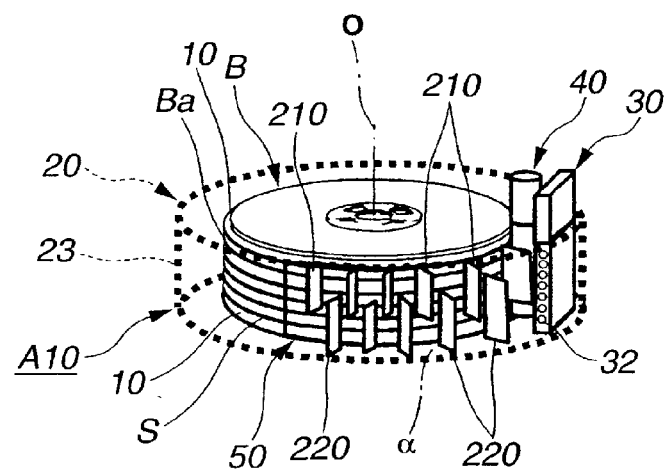
FIG. 13 is a schematic perspective view showing a fuel cell assembly A10 according to a tenth embodiment.

FIG. 13 shows a fuel cell assembly A10 according to a tenth embodiment schematically in perspective. In the tenth embodiment, each guide member 50 is provided with upper radial fins 210 and lower radial fins 220. Upper fines 210 are arranged circumferentially around stack structure B at angular intervals at a higher level, and lower fins 220 are arranged, at a lower level, circumferentially around stack structure B at angular positions which do not overlap the angular positions of upper fins 210.

Each of upper and lower radial fins 210 and 220 is in the form of an upright rectangular plate having a height slightly greater than a half of the height H-prime of guide members 50, and a width equal to a radial distance between the outside surface of each guide member 50 and the inside surface of circumferential wall 23 of case 20. The gas guide including the guide members 50 and these fins 210 and 220 attached to guide members 50 can improve the heat exchange efficiency between the first reactant gas and stack structure B by increasing the surface area of the gas guide. In the example of FIG. 13, each of radial fins 210 and 220 is formed with no communication holes unlike the fins 190, and the first reactant gas flows in a zigzag course defined by upper and lower radial fins in each circumferential passage.

Figure 14A:
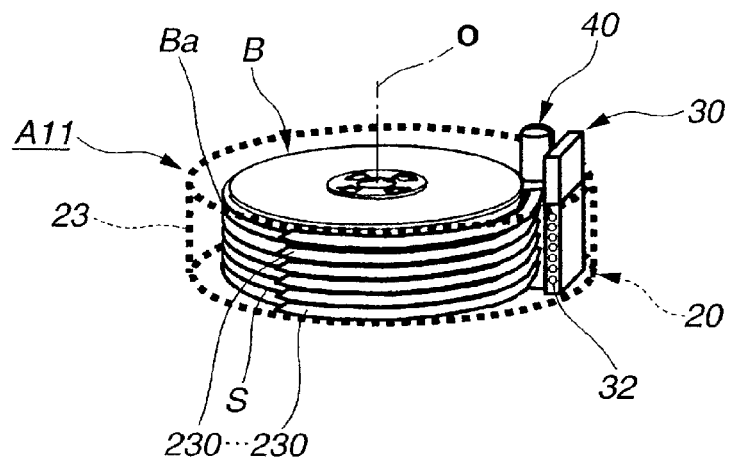
FIG. 14A(14-A) is a schematic perspective view.
Figure 14B:
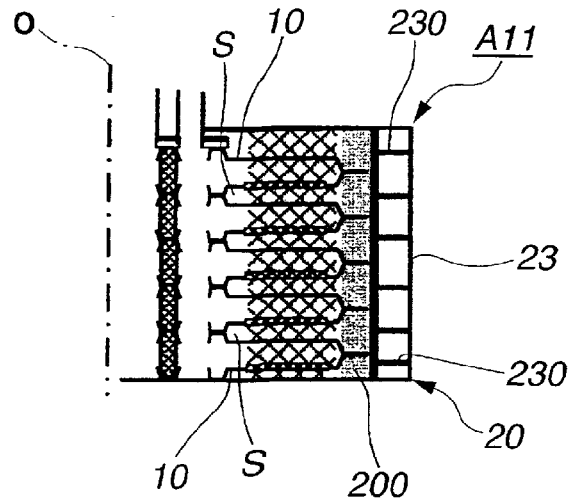
FIG. 14B(14-B) is a partial sectional view.

FIG. 14 shows a fuel cell assembly A11 according to an eleventh embodiment in perspective in FIG. 14A and in section in FIG. 14B. In this embodiment, the gas guide comprises an outside heat transfer section in the form of a plurality of circumferential fins 230 projecting radially outwards from the outside surface of each guide member 50 and extending circumferentially.

Each guide member 50 is formed with a plurality of circumferential fins 230 extending circumferentially and horizontally from the base end to the forward end of the guide member 50 at different levels or heights. In this example, the circumferential fins 230 are arranged vertically at the stack pitch of cell units 10 so that one circumferential fin 230 corresponds uniquely to one cell unit 10, and each circumferential fin 230 has a width equal to the radial distance between the outside surface of the guide member 50 and the inside surface of circumferential wall 23 of case 20, as best shown in FIG. 14B. Thus, circumferential fins 230 extend radially from the guide member 50 to circumferential wall 23 and define a plurality of circumferential passage segments arranged one above another as shown in FIG. 14B. The circumferential fins 230 can improve the heat exchange efficiency and serve as a plate for smoothing the flow of the reactant gas in the circumferential passage. In this example, the inside insulating layer 200 is formed between each guide member 50 and stack structure B as in the example of FIG. 12B. The thus-constructed fuel cell assembly can provide the same effects and advantages as in the first embodiment.

Figure 15A:
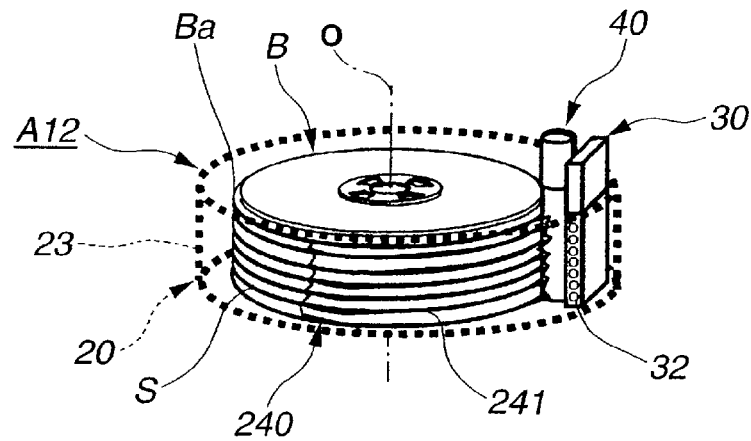
FIG. 15A(15-A) is a schematic perspective view.
Figure 15B:
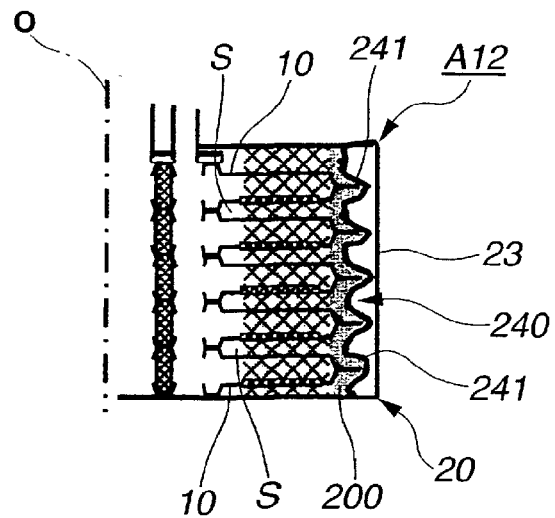
FIG. 15B(15-B) is a partial sectional view.

FIG. 15 shows a fuel cell assembly A12 according to a twelfth embodiment schematically in perspective in FIG. 15A and in section in FIG. 15B. In the 12th embodiment, the gas guide includes at least one corrugated guide member 240 having corrugations or having alternating ridges 241 and grooves extending circumferentially. In this example, the gas guide includes two (first and second) corrugated guide members 240 curved in the form of a circular arc like the first and second guide members 50 shown in FIG. 1B. As shown in the section of FIG. 15B, the ridges 241 of each corrugated guide member 240 are triangular in section, and arranged vertically so that one ridge 241 is formed for a unique one of the cell units 10. Each corrugated guide member 240 is formed by shaping a plate into folds, so that each corrugated guide member 240 includes a corrugated or undulating outside surface and a corrugated or undulating inside surface.

Ridges (or corrugations) 241 projecting radially outwards can serve as the heat transfer section for improving the heat exchange efficiency, and serve as the plate for smoothing the flow of the reactant gas in the circumferential passage like circumferential fins 230. In this example, inside insulating layer 200 is formed between stack structure B and the corrugated inside surface of each corrugated guide member 240. The thus-constructed fuel cell assembly A12 can provide the same effects and advantages as the assembly A1 of the first embodiment.

Figure 16A:
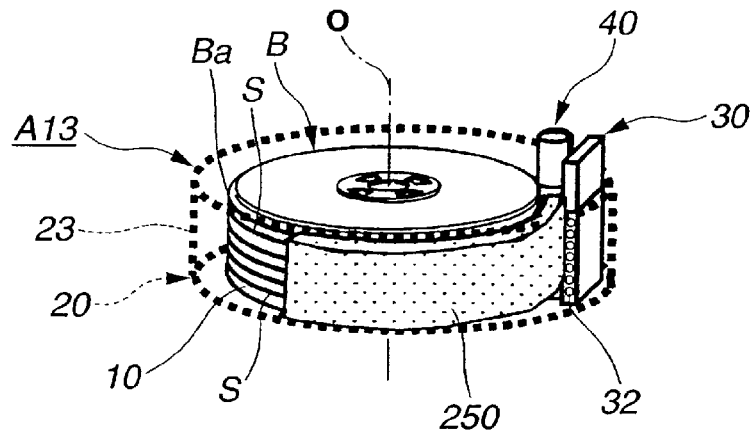
FIG. 16A(16-A) is a schematic perspective view.
Figure 16B:
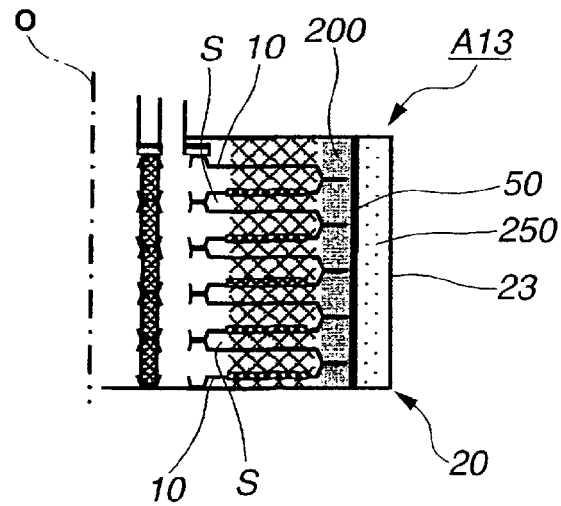
FIG. 16B(16-B) is a partial sectional view.

FIG. 16 shows a fuel cell assembly A13 according to a thirteenth embodiment schematically in perspective in FIG. 16A and in section in FIG. 16B. In fuel cell assembly A13, a porous layer 250 of porous material is provided between the gas guide and the circumferential wall 23 of the case. In the example of FIG. 16, porous layer 250 is formed between the outside surface of each guide member 50 and the inside surface of circumferential wall 23 of case 20, by filling the porous material therebetween. The porous material is a thermally conductive material having a good heat conductivity. Porous layer 250 of this example is joined to the guide member 50 by spot welding, laser welding, seam welding or other joining means. Instead of the above-mentioned joining methods, it is optional to fix the porous layers 250 to guide members 50 by bonding method with adhesive such as electrically conductive adhesive or electrically conductive paste. The interposition of the porous layer can further improve the heat exchanging efficiency with the first reactant gas. In the example of FIG. 16, inside insulating layer 200 is disposed between stack structure B and each guide member 50. Thus, according to the 13th embodiment, the gas guide includes at least one guide member and a porous portion (250) which is provided on the outside surface of the guide member and which can serve as the outside heat transfer section, and the gas guide may further include an inside insulating layer (200) provided on the inside surface of the guide member.

Figure 17A:
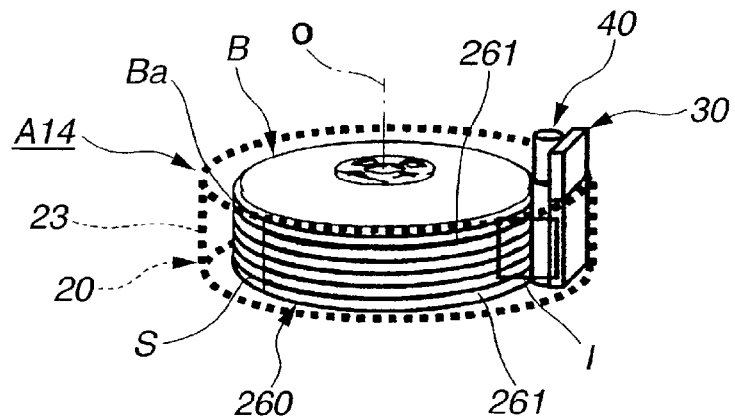
FIG. 17A(17-A) is a schematic perspective view.
Figure 17B:
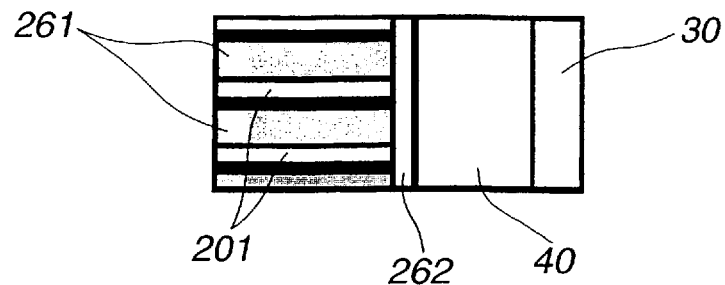
FIG. 17B(17-B) is an enlarged view showing an insulating structure in a part indicated by a rectangle I in FIG. 17A.
Figure 17C:
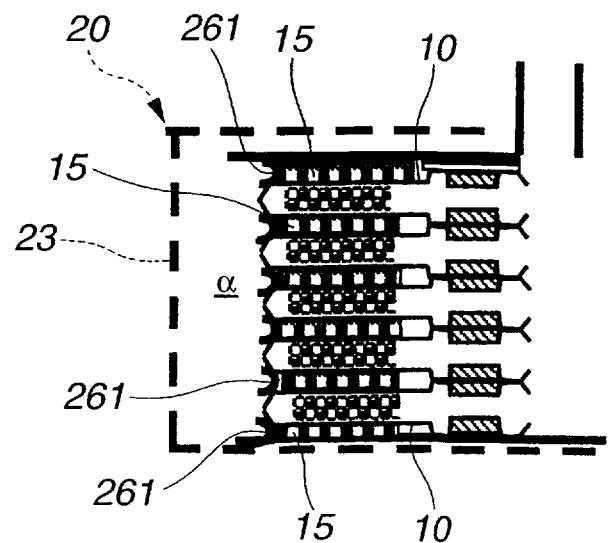
FIG. 17C(17-C) is a sectional view.

FIG. 17 shows a fuel cell assembly A14 according to a fourteenth embodiment schematically in perspective of FIG. 17A, in partial enlargement of FIG. 17B and in section of FIG. 17C. In the 14th embodiment, the gas guide includes a segmented guide. The segmented guide includes at least one segmented guide member 260 composed of guide segments 261. In this example, each guide segment 261 covers one of the interspaces among the cell units. Segmented guide member 260 is a set of guide segments (or pieces) 261 each covering one of the cell units 10. Each guide segment 261 is a long narrow piece or strip extending circumferentially around stack structure B like an arc of a circle. In this example, each guide segment 161 has a width corresponding to the width (or height) of the interspaces [s] between cell units 10. Guide segments 161 are arranged one above another in a multi-tier structure.

In this example shown in FIG. 17, the gas guide includes two of the segmented (or multi-tiered) guide members 260 each including guide segments 261. Segmented guide members 260 are arranged symmetrically with respect to the median plane ([a]) like guide members 50 shown in FIG. 1B, so as to cover and close two thirds of the outer periphery Ba of stack structure B and to define circumferential fluid passages alpha between guide members 260 and the circumferential wall 23 of case 20. Each guide segment 261 extends circumferentially in the form of a circular arc like the circular arc shape of each of guide members 50 shown in FIG. 1B.

Insulating segments or layers 201 are formed so that each insulating segment 201 is interposed between two adjacent guide segments 261 located one just above the other. Insulating segments 201 are similar to the before-mentioned inside insulating layers 200 (shown in FIG. 12B). Moreover, in the example of FIG. 17, an outlet insulating layer 262 is interposed between the outlet pipe 40 and each of guide segments 261. Outlet insulating layer 262 is made of material, such as ceramic sheet, having electrical insulating properties and thermal conductivity. However, it is optional to employ gastight glass joint or use a ceramic adhesive for the guide segments 261 and stack structure B.

This insulating structure including insulating segments 201 can prevent electrical short-circuit in the stack structure B in the stack direction, improve the thermal conductivity in the horizontal direction of stack structure B, and transmit heat inside the stack structure B to guide segments 261 efficiently.

Guide segments 261 may be formed in various forms beyond the limitation of the form shown in the illustrated example of FIG. 17. For example, each guide segment 261 may be an arc-shaped band welded to the outer periphery of outer collector 15, so as to close or cover part of the outer periphery of outer collector 15, or a compact or dense layer or segment formed by filling adhesive having electric conductivity at high temperatures, electrically conductive paste, metallic glass, or brazing filler metal.

Figure 18:
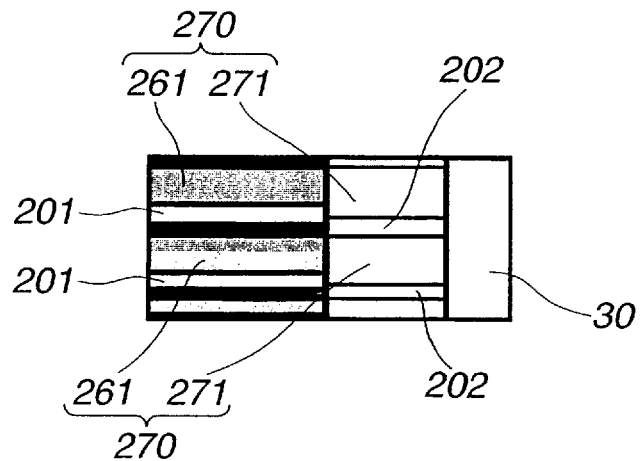
FIG. 18 is an enlarged view showing a variation of the insulating structure of FIG. 17B.

FIG. 18 shows compound segments or members 270 each composed of one of guide segments 261 and one of outlet pipe segments 271 forming the outlet pipe (40). The structure shown in FIG. 18 can be employed in place of the structure shown in FIG. 17B. In the fuel cell assembly A14 shown in FIGS. 17A, 17B and 17C, the gas outlet pipe 40 is a single jointless pipe formed as an integral unit (as in the fuel cell assemblies A1~A13 of the preceding embodiments). In the structure of FIG. 18, by contrast, the gas outlet pipe is a stack of outlet pipe segments 271 stacked with the interposition of insulating pipe segments 202. Each of the outlet pipe segments 271 and the insulating pipe segments 202 is an annular piece in the form of a hollow cylinder or a round slice of a pipe. Each outlet pipe segment 271 has a height equaling the interspace [s] in stack structure B, and each compound segment 270 includes one outlet pipe segment 271, and one guide segment 261 fixed to the circumferential wall of the outlet pipe segment 271. The segmented outlet pipe is formed by joining outlet pipe segments 271 through insulating pipe segments 202. Simultaneously with the joining the outlet pipe segments 271, the insulating segment 201 is interposed between the upper guide segment 261 and the lower guide segment 261.

In the example of FIG. 18, guide segment 261 and at least one of the cell plate, separator and inner collector which become equal in electric potential at the time of power generation are joined by laser welding, seam welding, spot welding, brazing or other method, to each of outlet pipe segments 271 on one hand. On the other hand, stack structure B is formed by stacking cell units 10, and the outlet pipe is formed by stacking outlet pipe segments 271 through glass adhesive or ceramic adhesive. The thus-constructed compound segmented structure can prevent electrical short-circuit in the stack structure B in the stack direction, improve the thermal conductivity in the plane of the unit surface in stack structure B, and transmit internal heat in the stack structure B to the outlet pipe efficiently.

Figure 19A:
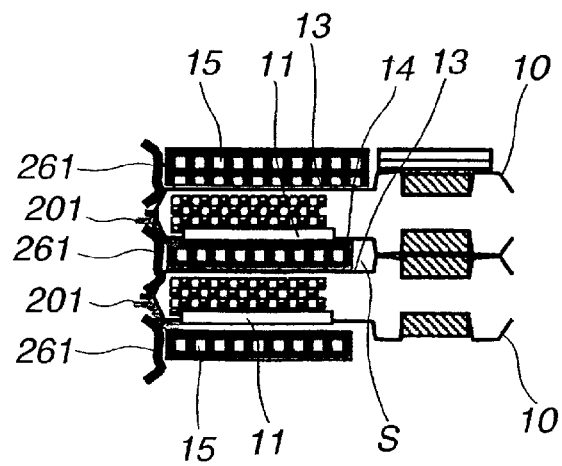
FIG. 19A(19-A) is a sectional view showing another example of guide segments shown in FIG. 17.

FIG. 19 shows other examples of the arrangement of the guide segments 261. In the example shown in FIG. 19A, each guide segment 261 extends along the outer periphery of outer collector 15 between upper and lower adjacent cell units 10. This guide segment 261 is disposed between cell plate 14 of the upper cell unit 10 and separator 13 of the lower cell unit 10, and one insulating segment 201 is interposed between the guide segment 261 and the cell plate 14.

Figure 19B:
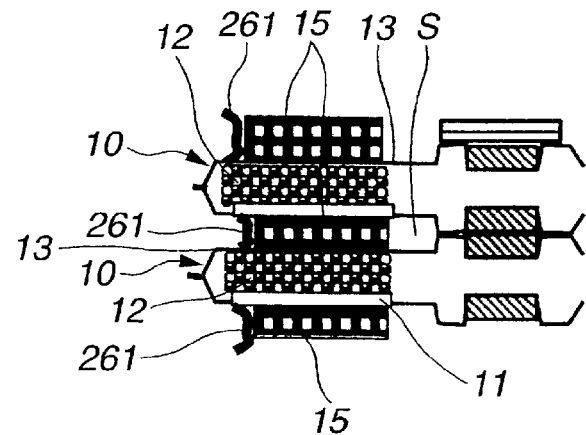
FIG. 19B(19-B) is a sectional view showing another example of guide segments shown in FIG. 17.

In the example shown in FIG. 19B, each guide segment 261 extends along the outer periphery of outer collector 15 between upper and lower adjacent cell units 10, and this guide segment 261 is disposed between solid electrolyte cell 11 of the upper cell unit 10 and separator 13 of the lower cell unit 10.

FIG. 20 shows examples of the segmented structure including guide segments 261 and heat transfer segments. In the example of FIG. 20A, the segmented structure includes guide segments 261 each extending along the outer periphery of one outer collector 15, (circumferential) fins 230 each projecting from one of guide segments 261, for serving as the heat transfer segment, and insulating segments 201 each interposed between one of guide segments 261 and the adjacent cell plate 14. Fins 230 of this example are substantially identical to fines 230 shown in FIG. 14. In this example, each fin 230 projects from the outside surface of the corresponding guide segment 261 radially outwards, up to an outer end which is in tight contact with a circumferential insulating layer 760 formed on the inside surface of circumferential wall 23 of case 20.

Figure 20A:
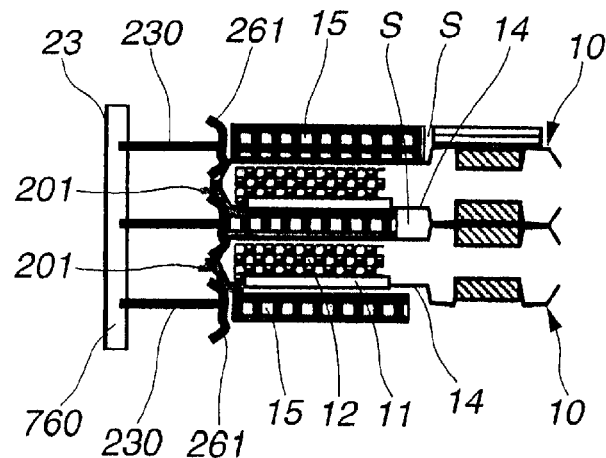
FIG. 20A(20-A) is a sectional view for showing an example of a segmented structure including guide segments and heat transfer segments.
Figure 20B:
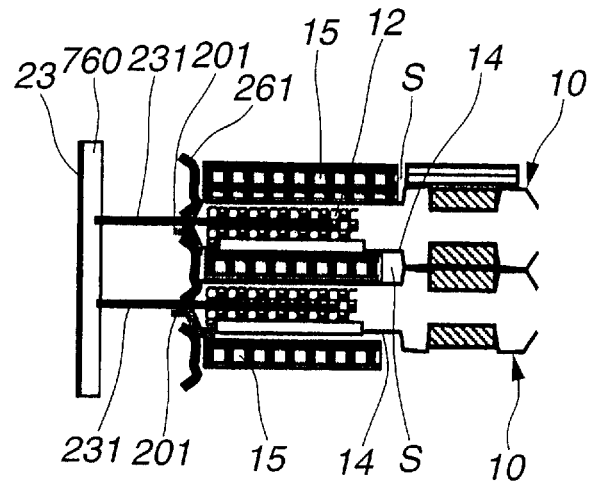
FIG. 20B(20-B) is a sectional view for showing an example of the segmented structure including guide segments and heat transfer segments.

In the example of FIG. 20B, the segmented structure includes guide segments 261 each extending along the outer periphery of one of outer collectors 15, (circumferential) fins 231 each projecting from the inner collector 12 in one cell unit 10, for serving as the heat transfer segment, and insulating segments 201 each interposed between one guide segment 261 and the cell plate 14 of the adjacent cell unit 10. In this example, each (circumferential) fin 231 extends radially outwards, up to an outer end which is in tight contact with the circumferential insulating layer 760 formed on the inside surface of circumferential wall 23 of case 20, like the example of FIG. 20A.

Figure 20C:
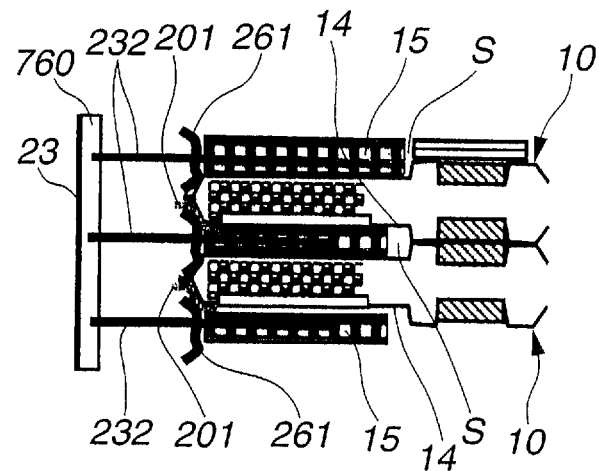
FIG. 20C(20-C) is a sectional view for showing an example of the segmented structure including guide segments and heat transfer segments.

In the example of FIG. 20C, the segmented structure includes guide segments 261 each extending along the outer periphery of one of outer collectors 15, (circumferential) fins 232 each projecting from one of outer collectors 15, for serving as the heat transfer segment, and insulating segments 201 each interposed between one guide segment 261 and the cell plate 14 of the adjacent cell unit 10. In this example, each (circumferential) fin 232 extends radially outwards, up to an outer end which is in tight contact with the circumferential insulating layer 760, like the example of FIGS. 20A and 20B.

Figure 20D:
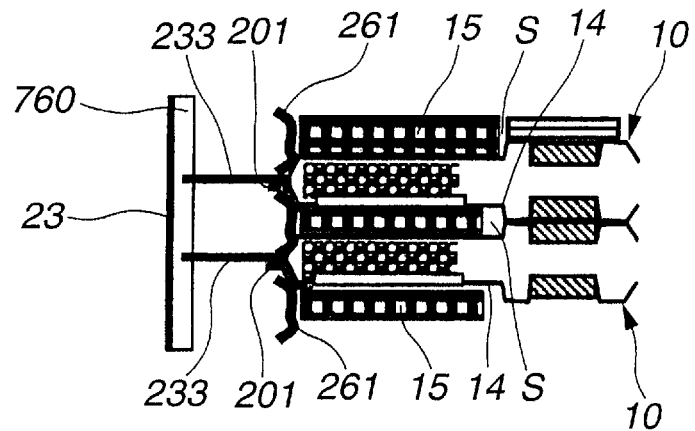
FIG. 20D(20-D) is a sectional view for showing an example of the segmented structure including guide segments and heat transfer segments.

In the example of FIG. 20D, the segmented structure includes guide segments 261 each extending along the outer periphery of one of outer collectors 15, (circumferential) fins 233 each projecting from the junction portion of cell plate 14 and separator 13 (or from the frame formed by the cell plate 14 and separator 13), as a unit, for serving as the heat transfer segment, and insulating segments 201 each interposed between one guide segment 261 and the cell plate 14 of the adjacent cell unit 10. In this example, each (circumferential) fin 233 extends radially outwards, up to an outer end which is in tight contact with the circumferential insulating layer 760, like the examples of FIGS. 20A~20C.

Figure 20E:
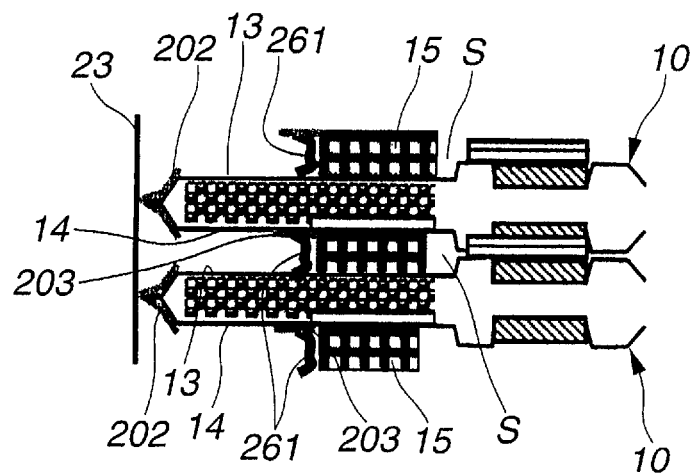
FIG. 20E(20-E) is a sectional view for showing an example of the segmented structure including guide segments and heat transfer segments.

In the example of FIG. 20E, each cell unit 10 has a greater outside diameter, so that the outer periphery of each cell unit 10 is closer to the circumferential wall 23 of case 20, and a circumferential insulating segment 202 is interposed between the inside surface of circumferential wall 23 of case 20 and the outer periphery of each cell unit 10. Each of guide segments 261 extends along the outer periphery of one of outer collectors 15, and each of insulating segments 203 is interposed between one guide segment 261 and the cell plate 14 of the adjacent upper cell unit 10. In the example of FIG. 20E, the outer collectors 50 are smaller in outside diameter than the cell units 10, and the guide segments 261 extend like an arc of a circle which is smaller than the outer peripheries of unit cells 10 as shown in FIG. 20E. Each of cell units 10 projects radially outwards beyond the outer peripheries of outer collectors 15, and thereby serves as the heat transfer segment for improving the heat exchange efficiency without the need for additional fins. In this example, the insulating segments 202 and 203 can be made of insulating material identical to the insulating material of insulating layer 60. In the five examples of FIGS. 20A~20E, each of the insulating segments 201, or 203 is interposed between one guide segments and the frame (13, 14) of the adjacent cell unit 10.

FIG. 21 shows further examples of the segmented structure including guide segments and heat transfer segments. In the example of FIG. 21A, the segmented structure includes guide segments (or insulating wall segments) 280 made of insulating material having electrical insulating properties. Each of guide segments 280 extends along the outer periphery of one outer collector 15, between the outer circumferential portions of two adjacent upper and lower unit cells 10, so as to form a gastight barrier or wall or a guide member in the form of a gas guide wall covering and closing about two thirds of the outer periphery Ba of stack structure B, like guide members 50 shown in FIG. 1B. In this example, guide segments 280 are attached tightly to the outer peripheries of outer collectors 15 and cell units 10. Thus, the guide segments 280 serves as the guide member like guide segments 261 shown in FIG. 20.

Figure 21A:
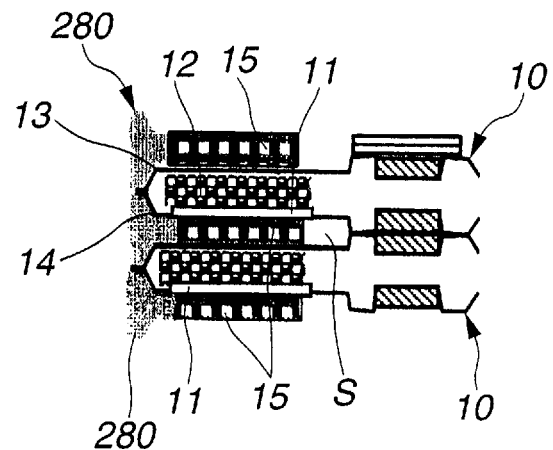
FIG. 21A(21-A) is a sectional view for showing an example of the segmented structure including guide segments and heat transfer segments.
Figure 21B:
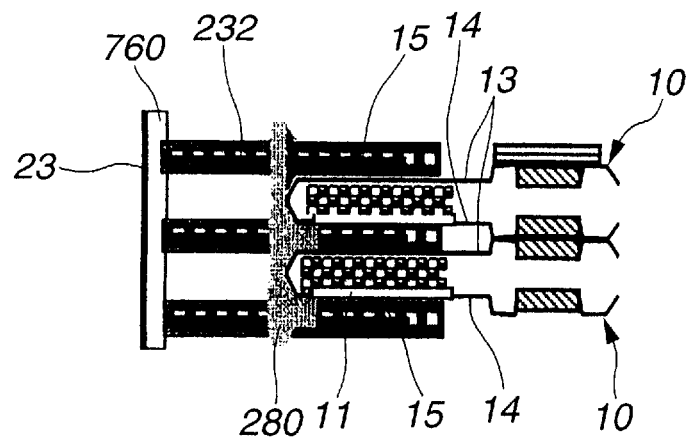
FIG. 21B(21-B) is a sectional view for showing an example of the segmented structure including guide segments and heat transfer segments.

In the example of FIG. 21B, the segmented structure includes guide segments 280 each extending along the outer periphery of one outer collector 15, between the outer circumferential portions of two adjacent upper and lower unit cells 10, so as to form a gastight barrier as in the example of FIG. 21A, and (circumferential) fins 232 each projecting from one of outer collectors 15, for serving as the heat transfer segment. Each fin 232 of FIG. 21B is coated with insulating material identical to the insulating material of guide segments 280. In this example, each (circumferential) fin 232 extends radially outwards, up to an outer end which is in tight contact with the circumferential insulating layer 760 formed on the inside surface of circumferential wall 23 of case 20.

Figure 21C:
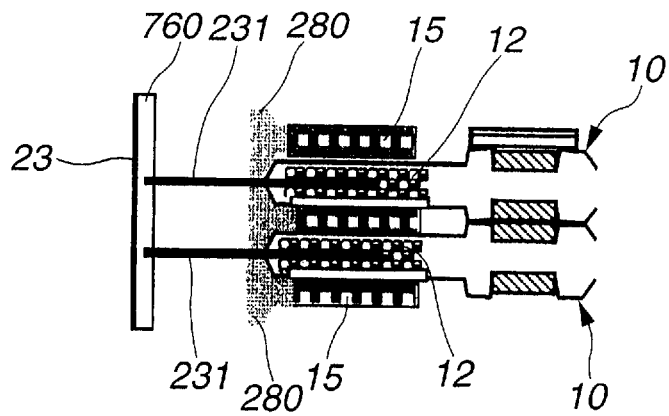
FIG. 21C(21-C) is a sectional view for showing an example of the segmented structure including guide segments and heat transfer segments.

In the example of FIG. 21C, the segmented structure includes guide segments 280 each extending along the outer periphery of one outer collector 15, between the outer circumferential portions of two adjacent unit cells 10 placed one directly above the other, so as to form a gastight barrier as in the example of FIG. 21A, and (circumferential) fins 231 each projecting from the inner collector 12 in one cell unit 10, for serving as the heat transfer segment. Each fin 231 of FIG. 21C projects radially outwards, up to an outer end which is in tight contact with the circumferential insulating layer 760 formed on the inside surface of circumferential wall 23 of case 20.

Figure 21D:
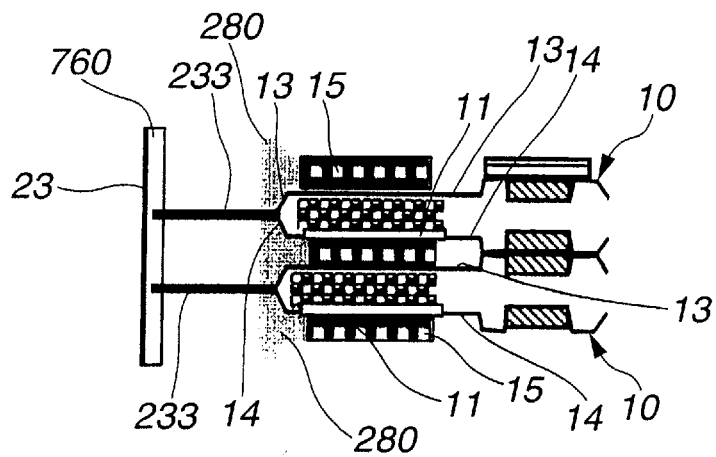
FIG. 21D(21-D) is a sectional view for showing an example of the segmented structure including guide segments and heat transfer segments.

In the example of FIG. 21D, the segmented structure includes guide segments 280 each extending along the outer periphery of one outer collector 15, between the outer circumferential portions of two adjacent unit cells 10 placed one directly above the other, so as to form a gastight barrier as in the example of FIG. 21A, and (circumferential) fins 233 each projecting from the junction portion of cell plate 14 and separator 13, or from the frame, as a unit, for serving as the heat transfer segment. Each fin 233 of FIG. 21D projects radially outwards, up to an outer end contacting with the circumferential insulating layer 760 of circumferential wall 23 of case 20.

Figure 21E:
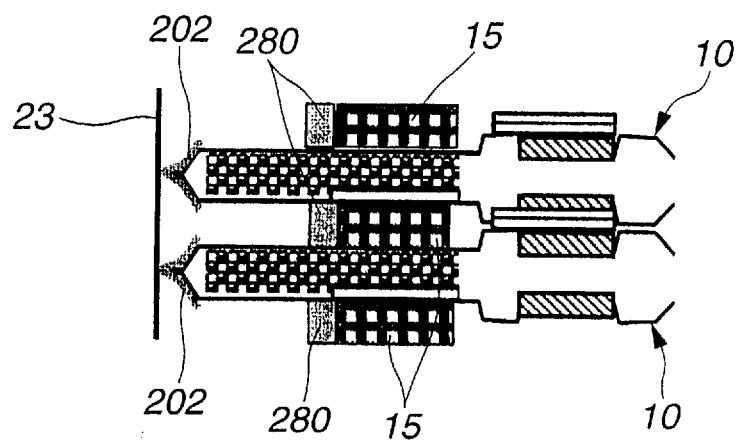
FIG. 21E(21-EA) is a sectional view for showing an example of the segmented structure including guide segments and heat transfer segments.

In the example of FIG. 21E, each cell unit 10 has a greater outside diameter, so that the outer periphery of each cell unit 10 is closer to the circumferential wall 23 of case 20, and a circumferential insulating segment 202 is interposed between the inside surface of circumferential wall 23 of case 20 and the outer periphery of each cell unit 10 as in the example of FIG. 20E. Each of guide segments 280 extends along the outer periphery of one of outer collectors 15 between two adjacent cell units 10 on the upper and lower sides. Each of cell units 10 projects radially outwards beyond the outer peripheries of outer collectors 15, and thereby serves as the heat transfer segment as in the example of FIG. 20E. In the examples of FIGS. 21B~21E, the circumferential passage is divided into circumferential passage segments by the circumferential fins 232, 231 or 233 or the insulating segments 202 with the extended cell units, like the circumferential fins 230~233 and the insulating segments 202 in the examples of FIGS. 20A~20E.

Figure 22A:
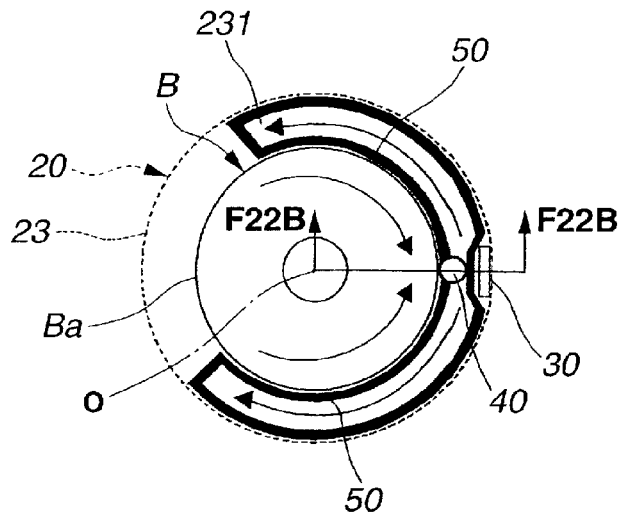
FIG. 22A(22-A) is a horizontal sectional view showing a fuel cell assembly having fins 231 shown in FIG. 20B.
Figure 22B:
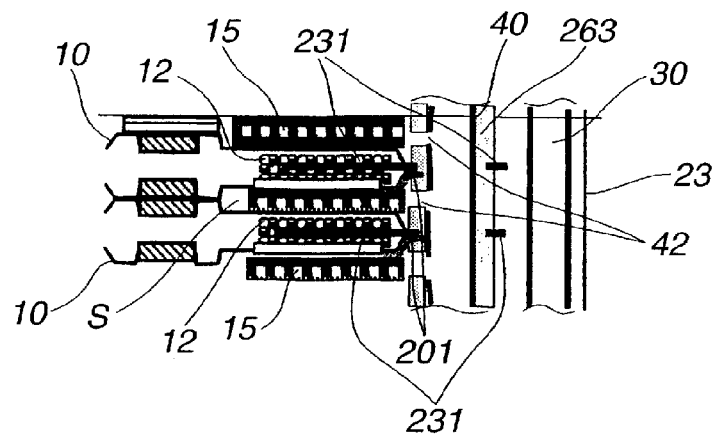
FIG. 22B(22-B) is a sectional view taken across a line F22B-F22B.
Figure 22C:
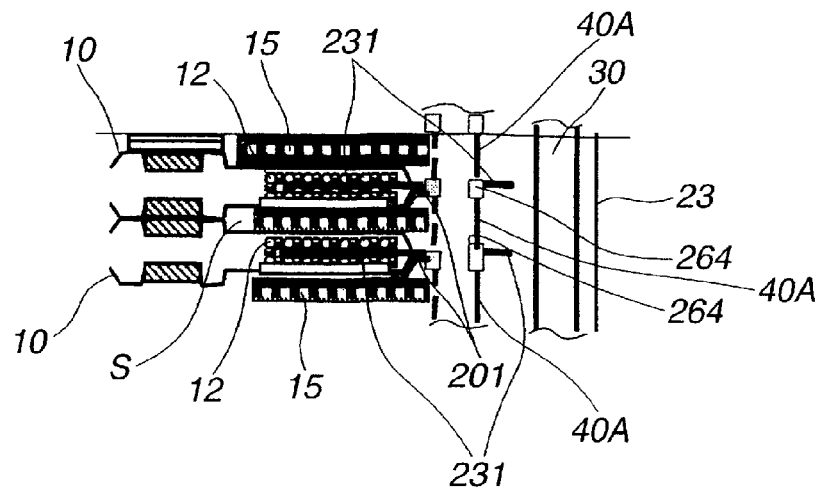
FIG. 22C(22-C) is a sectional view taken across the line F22B-F22B for showing another example.

FIG. 22 shows examples of an insulating structure between fins 231 of the type shown in FIG. 20B and FIG. 21C, and the gas outlet pipe. Each of fins 231 projects from the inner collector 12 of one of unit cells 10 as shown in FIG. 20B. FIG. 22B shows one example in section taken across a line F22B-F22B shown in a plan view of FIG. 22A. FIG. 22C is a similar sectional view but showing another example. In the example of FIG. 22B, an outlet insulating layer 263 is formed on the outside surface of the circumferential wall of outlet pipe 40, and each fin 231 projects from inner collector 12 of one cell unit 10 to an end abutting on the outlet insulating layer 263. In the example of FIG. 22C, the outlet port includes an outlet pipe formed by connecting pipe segments 40A through insulating portions 264 and each of fins 231 abuts on one of the insulating portions 264. Each fin 231 of the heat transfer section is in tight contact with the outlet pipe through one of insulating portions 264. In FIG. 22, the heat transfer section includes fins 231 projecting from inner collectors 12. However, it is possible to employ various fins projecting from cell units 10 or outer collectors 15 as shown in FIGS. 20 and 21.

Figure 23A:
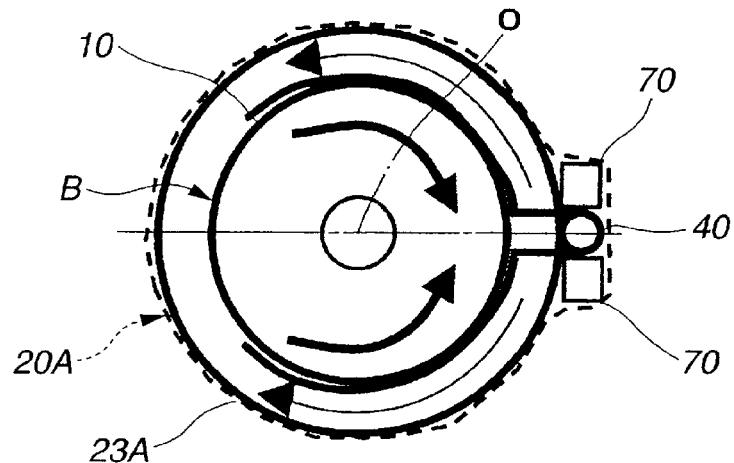
FIG. 23A(23-A) is a plan view showing a fuel cell assembly including a case 20A having a projecting portion.
Figure 23B:
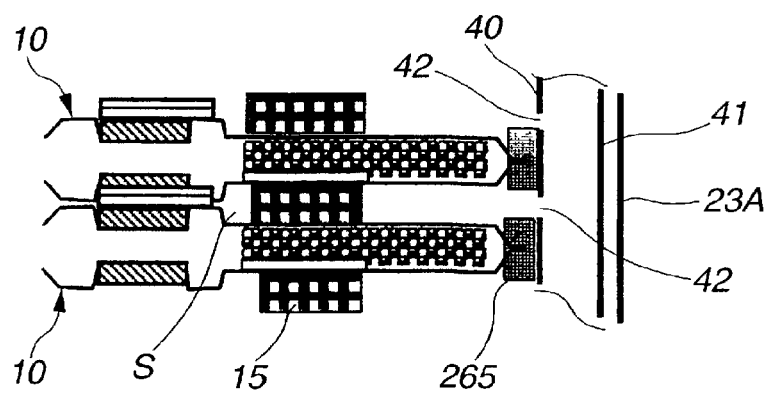
FIG. 23B(23-B) is a sectional view showing one example of the insulating structure between the outlet pipe and cell units.
Figure 23C:
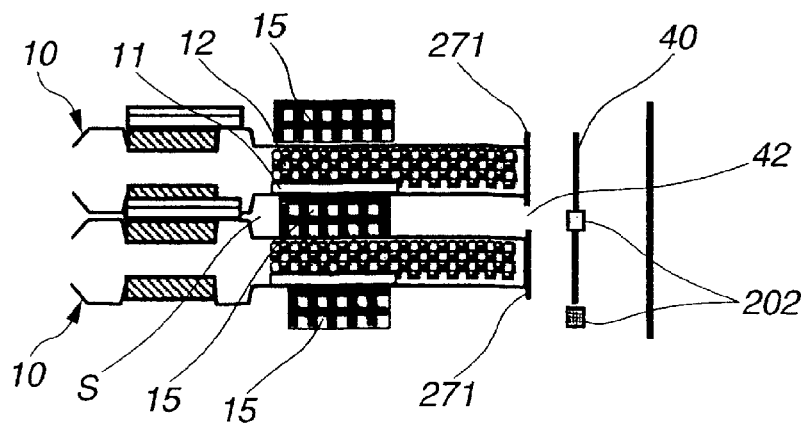
FIG. 23C(23-C) is a sectional view for showing another example.

FIG. 23 shows examples of an insulating structure between the cell units 10 and the gas outlet pipe. A case 20A shown in a plan view of FIG. 23A includes a circumferential wall 23A formed with an outward projection in which two inlet pipes 70 and outlet pipe 40 are disposed. FIG. 23B and FIG. 23C shows examples of the insulating structure between cell units 10 and outlet pipe 40.

In the example of FIG. 23B, an outlet insulating layer 265 is formed on the circumferential wall of outlet pipe 40 at a position confronting the outer periphery of cell units 10. Each of cell units 10 projects radially outward beyond the outer collectors 15, and abuts on the insulating layer 265 which is tightly interposed between outlet pipe 40 and cell units 10. Cell units 10 has a larger outside diameter to reach the outlet insulating layer 265.

In the example of FIG. 23C, the outlet pipe is a segmented outlet pipe composed of pipe segments 271 each corresponding to a unique one of cell units 10, and insulating segments 202 insulating pipe segments 271 from one another. Each cell unit 10 projects radially outwards beyond the outer collectors 15, to an outer end which joined with the circumferential wall of one of pipe segments 271.

FIG. 24 shows a fuel cell assembly A15 of a fifteenth embodiment. FIG. 24A is a schematic perspective view showing only the gas guide and the outlet port. FIG. 24B is a perspective view showing outlet holes 282 and 292 of first and second outlet pipes 280 and 290 of the outlet port. FIGS. 24C and 24D are schematic plan views for illustrating the flows of the first reactant gas in two adjacent interspaces in the stack structure.

The fuel cell assembly A15 includes the stack structure B enclosed in the case (not shown), the inlet pipe (not shown), the outlet port composed of first and second outlet pipes 280 and 290, and the gas guide including at least one guide member 300 for guiding the first reactant gas around stack structure B, and allowing the first reactant gas to flow through the open region into stack structure B and to flow through the interspaces [s] to first and second outlet pipes 280 and 290.

Figure 24A:
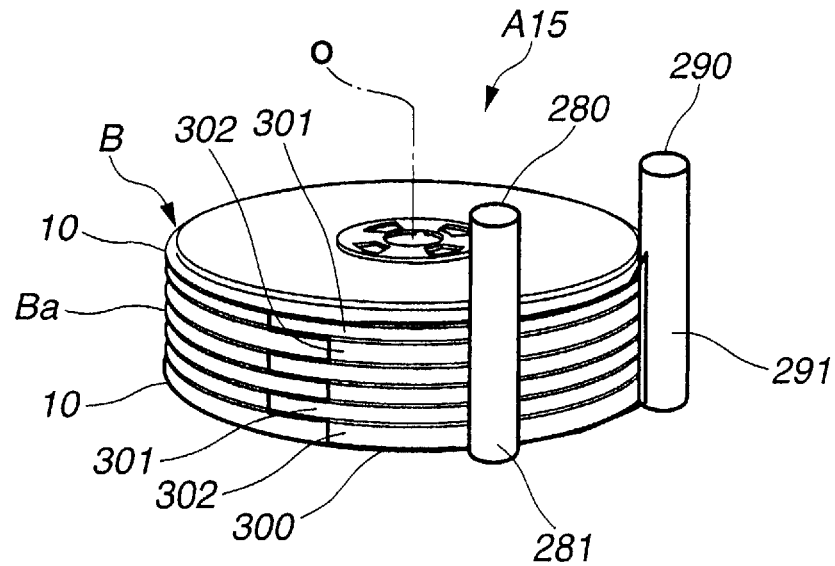
FIG. 24A(24-A) is a perspective view showing guide members and outlet pipes arranged around the stack structure.
Figure 24B:
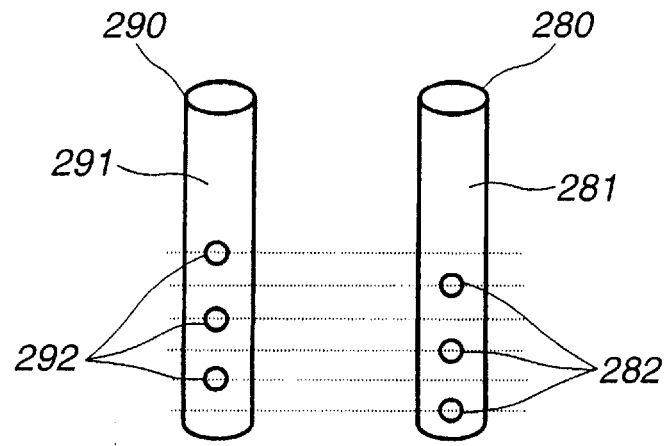
FIG. 24B(24-B) is a perspective view for showing outlet holes formed in the two outlet pipes.

Each of first and second outlet pipes 280 and 290 is fixed to guide member 300, and formed with outlet holes 282 or 292 arranged in a vertical row, as shown in FIG. 24B. The vertical positions or heights of outlet holes 282 of first outlet pipe 280 and outlet holes 292 of second outlet pipe 29 are arranged alternately as shown in FIG. 24B. In this example, each outlet hole 282 of first outlet pipe 280 confronts the interspace [s] at one of the odd-numbered tiers numbered from the above whereas each outlet hole 292 of second outlet pipe 290 confronts the interspace [s] at one of the even-numbered tiers from the above. Each of the interspaces [s] in stack structure B is confronted by a unique one of the outlet holes 282 and 292, and the outlet holes 282 and 292 are distributed uniformly in the vertical direction. First and second outlet pipes 280 and 290 are spaced from each other in the circumferential direction. First and second outlet pipes 280 and 290 are different from each other in the position or heights of the outlet holes. When the tiers of the stacked cell units 10 are divided into a first subset (a subset of the odd-numbered tiers, for example) and a second subset (a subset of the even-numbered tiers, for example) so that each tier belongs only to one of the first and second subsets, each of the interspaces in the tiers of the first subset is opened to first outlet pipe 280 through one outlet hole 282, each of the interspaces in the tiers of the second subset is opened to second outlet pipe 290 through one outlet hole 292, and the tiers of the first and second subsets are distributed uniformly in the stack (vertical) direction to uniformize the temperature distribution in the stack direction.

Guide member 300 has a width substantially equal to the height of stack structure B, and includes first and second guide segments 301 and 302 each of which extends circumferentially in the form of a circular arc around the center axis O of stack structure B, and has a circumferential length to cover about ⅔ of the outer periphery Ba of stack structure B. First and second guide segments 301 and 302 are arranged alternately in the vertical direction. First guide segments 301 confront the interspaces [s] of the odd-numbered tiers numbered from the above, and second segments 301 confront the interspaces [s] of the even-numbered tiers numbered from the above. Each of first guide segments 301 extends in opposite directions from first outlet pipe 280 in the manner of bilateral symmetry with respect to a diametrical straight line O1 passing through the center axis O and through the vertical row of outlet holes 282, and bisecting first outlet pipe 280. Similarly, each of second guide segments 302 extends in opposite directions from second outlet pipe 290 in the manner of bilateral symmetry with respect to a diametrical straight line O2 passing through the center axis O and the vertical row of outlet holes 292, and bisecting second outlet pipe 290. Each of first and second segments 301 and 302 may be in the form of a single long strip or may be a set of shorter strips connected end to end, for example, through outlet pipes 280 and 290.

Figure 24C:
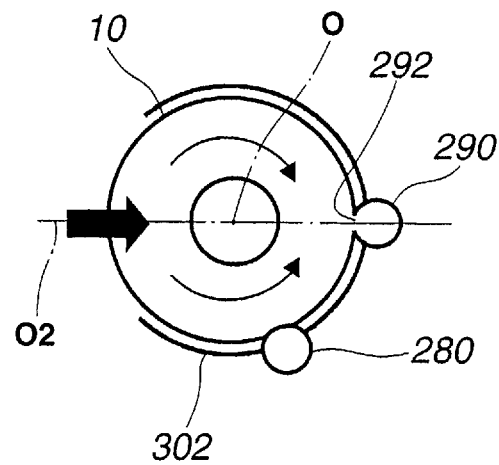
FIG. 24C(24-C) is a schematic view for illustrating streams of the first reactant gas in the interspaces of two consecutive tiers.
Figure 24D:
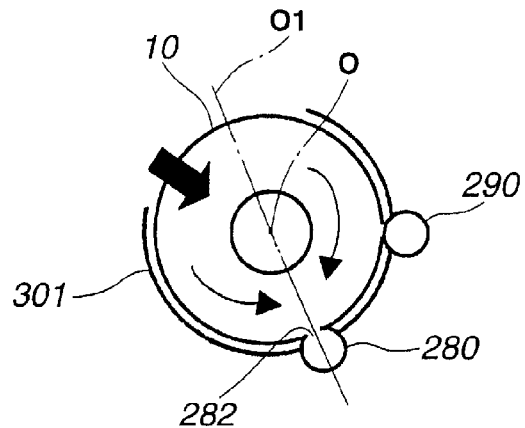
FIG. 24D(24-D) is a schematic view for illustrating streams of the first reactant gas in the interspaces of two consecutive tiers.

The first reactant gas flows differently between the interspaces in the odd-numbered tiers and the interspaces in the even-numbered tiers as shown by arrows in FIGS. 24C and 24D. In the tiers arranged as shown in FIG. 24D, the reactant gas flows through the interspace to the first outlet pipe 280, and is discharged only through first outlet pipe 280. In the tiers arranged as shown in FIG. 24C, the reactant gas flows through the interspace to the second outlet pipe 290, and is discharged only through second outlet pipe 290. This guide structure can make uniform the temperature distribution in the lateral direction and the vertical direction by avoiding overlap of low temperature regions or overlap of high temperature regions, and decrease the temperature difference in the stack structure.

Figure 25A:
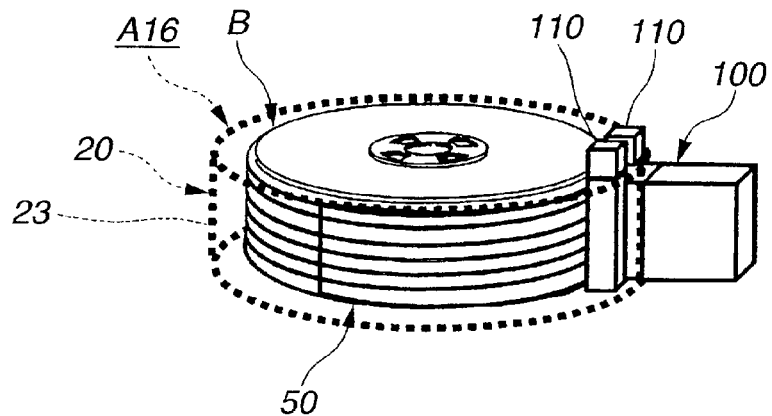
FIG. 25A(25-A) is a schematic perspective view showing the fuel cell assembly A16.
Figure 25B:
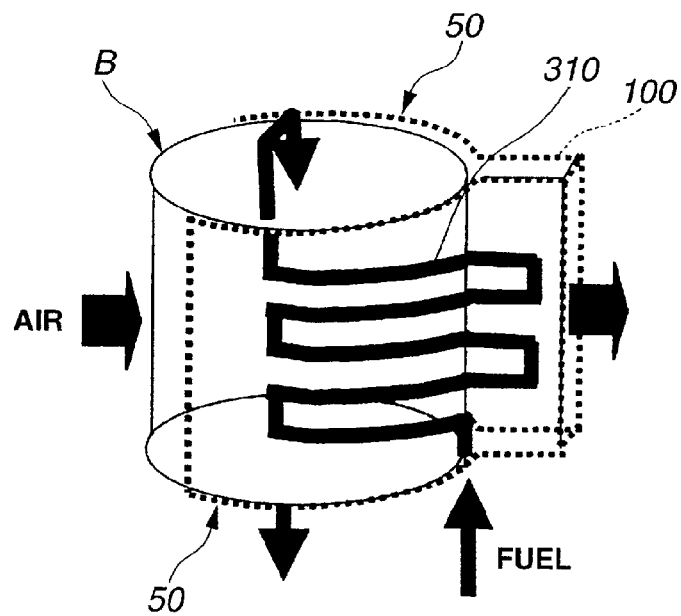
FIG. 25B(25-B) is a schematic perspective view for showing a reaction tube.

FIG. 25 shows a fuel cell assembly A16 according to a sixteenth embodiment. FIG. 25A schematically shows the construction of fuel cell assembly A16 in perspective, and FIG. 25B is a perspective view for illustrating the guide members and outlet pipe. Fuel cell assembly A16 has the construction similar to that of fuel cell assembly A4 shown in FIG. 7, but further includes a reforming catalyst reaction tube 310 provided on the outside surfaces of at least one of guide members 50 and the outlet pipe 100. Reforming catalyst reaction tube 310 is formed in the path for introducing the second reactant gas into cell units 10. Reforming catalyst reaction tube 310 meanders in a zigzag on the outside surface of guide member 50 and outlet pipe 10 as shown in FIG. 25B.

When heating is desirable at the time of starting or low load operation, this structure can heat the second reactant gas (lean fuel gas) by the use of the exhaust gas of outlet pipe 100 by conveying the second reactant gas through reforming catalyst reaction tube 310, while holding the temperature distribution of stack structure B uniform properly.

Figure 26A:
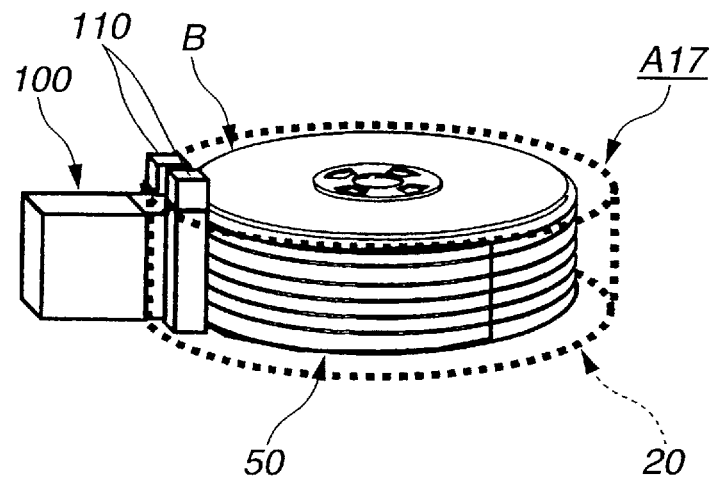
FIG. 26A(26-A) is a schematic perspective view showing the fuel cell assembly A17.
Figure 26B:
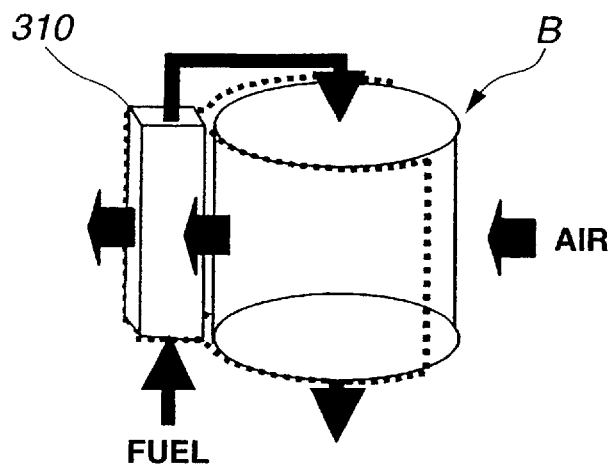
FIG. 26B(26-B) is a schematic perspective view for showing a reformer provided in the outlet port.
Figure 27:
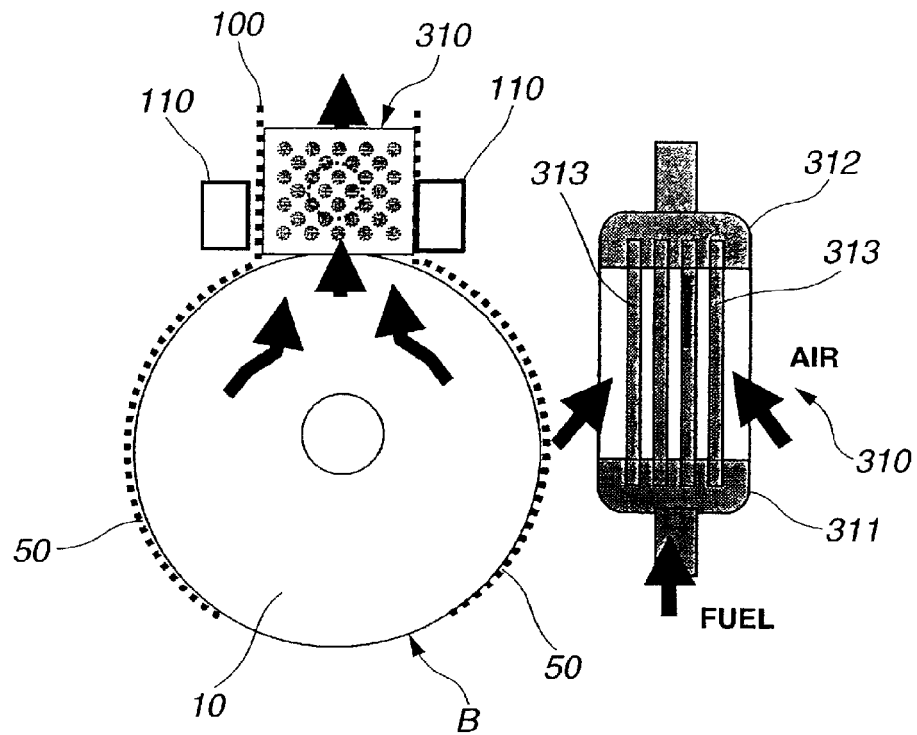
FIG. 27 shows one example of the reformer in a plan view of the fuel cell assembly and in a sectional view of the reformer.
Figure 28:
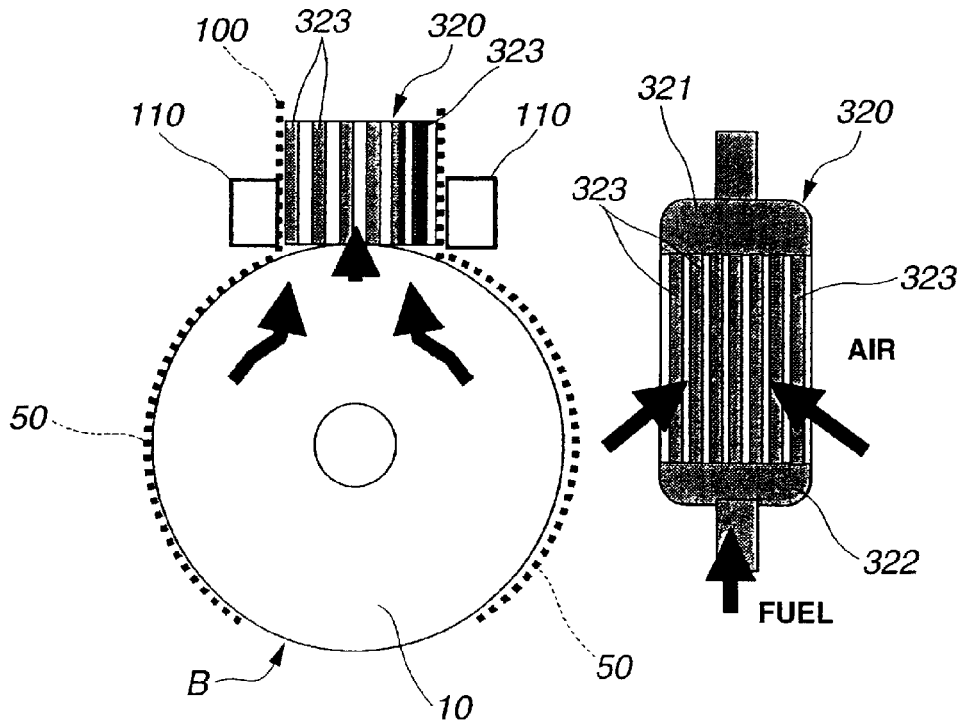
FIG. 28 shows another example of the reformer in a plan view of the fuel cell assembly and in a sectional view of the reformer.

FIG. 26 shows a fuel cell assembly A17 according to a seventeenth embodiment. FIG. 26A is a schematic perspective view of fuel cell assembly A17, and FIG. 26B is a schematic perspective view for illustrating the arrangement of a reformer provided in the outlet port. FIGS. 27 and 28 show two examples of the reformer. Fuel cell assembly A17 has the construction similar to that of fuel cell assembly A4 shown in FIG. 7, but further includes a reformer 310 (or 320) provided in outlet pipe 100.

Reformer 310, as shown in an enlarged section in FIG. 27, includes an inflow portion 311 for receiving the second reactant gas, an outflow portion 312 for discharging the second reactant gas, and a plurality of reforming catalyst reaction tubes 313 connecting inflow portion 311 and outflow portion 312. In reforming catalyst reaction tubes 313, catalyst for reforming the second reactant gas is filled or carried. Reforming catalyst reaction tubes 313 are round tubes having a circular cross section, and arranged in outlet pipe 100, as shown in plan in FIG. 27, with spaces among them.

Reformer 320, as shown in an enlarged section in FIG. 28, includes an inflow portion 322 for receiving the second reactant gas, an outflow portion 321 for discharging the second reactant gas, and a plurality of reforming catalyst reaction tubes 323 connecting inflow portion 322 and outflow portion 321, and including the catalyst for reforming the second reactant gas. In outlet pipe 100, reforming catalyst reaction tubes 323 are arranged in the direction perpendicular to the radial outward direction of stack structure B, as shown in plan in FIG. 28, with spaces among them. Each of reforming catalyst reaction tubes 323 is shaped like a plate having parallel opposite outside surface extending in the radial outward direction in which the first reactant gas is discharged through outlet pipe 100.

With the thus-constructed reformer 310 or 320, the fuel cell system can switch the reaction mode between endothermic reaction and exothermic reaction in accordance with a power generating condition, by causing steam reforming reaction in a high load operation and partial oxidation reaction in a low load operation and a starting operation, and thereby regulate the temperature of stack structure B adequately.

The structure including a tube reactor for endothermic reaction or an endothermic reaction tube disposed in or near the outlet port can recover heat at the time of high load operation with the endothermic reaction. In the tube reactor, steam reforming reaction and dehydrogenation reaction can be performed, for example. The endothermic tube reactor installed at the outlet port can function not only to cause the chemical reaction by using the heat produced in the high load operation, but also to moderate the flow velocity distribution of the first reactant gas flowing among the stacked cell units by increasing the pressure in the outlet port. Thus, according to the 17th embodiment, the fuel cell assembly further includes a reforming catalyst reaction tube which contains a catalyst for reforming the second reactant gas, and which is disposed in the vicinity of the outlet port or in the position enabling the transfer of heat between the outlet port and the reaction tube. Alternatively, the fuel cell assembly may include an endothermic reaction tube in the outlet port.

Figure 29A:
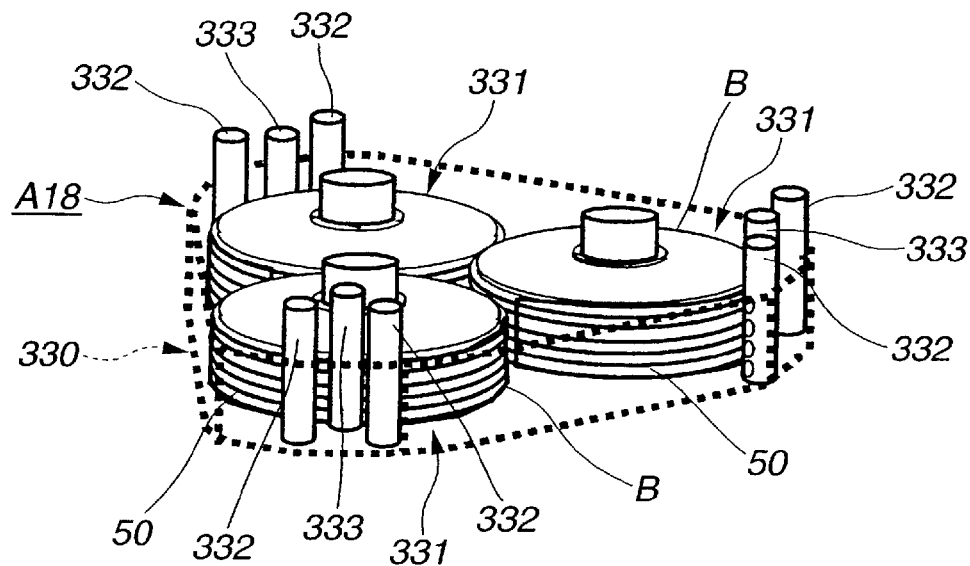
FIG. 29A is a schematic perspective view showing the fuel cell assembly A18 of the eighteenth embodiment.

FIG. 29A shows a fuel cell assembly A18 according to an eighteenth embodiment schematically in perspective. In this embodiment, a case 330 encloses a plurality of generating modules 331. In the example of FIG. 29A, three of the generating modules 331 are enclosed by case 330. Each of the generating modules 331 includes the stack structure B, the inlet port which, in this example, includes two inlet pipes 332 for introducing the first reactant gas into case 330, the outlet port which, in this example, includes one outlet pipe 333 for discharging the first reactant gas from case 330, and the gas guide which, in this example, includes guide members 50 (shaped and arranged as shown in FIG. 1). Case 330 includes a circumferential wall surrounding the three generating modules 331 and forms a circumferential passage with each of guide members 50 of the three modules. The open regions (P) of the modules are located in a central portion surrounded by the three modules 331. In the illustrated example, the center axes of the three stack structures B of the three modules are located at three separate positions defining an equilateral triangle, and the open region of each module opens toward the center of the equilateral triangle. In each module, the open region and the outlet pipe 333 are located at diagonally opposite positions, and the outlet pipe 333 is located on an imaginary diametrical straight line passing through the center axis of the stack structure of that module and through the center of the equilateral triangle formed by the three center axes of the three modules in the plan view.

Figure 29B:
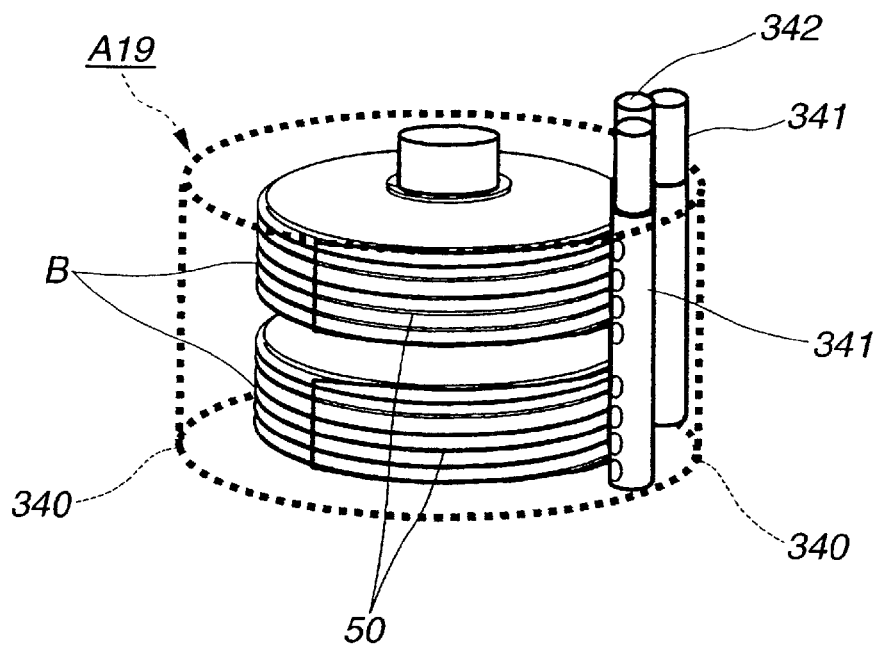
FIG. 29B is a schematic perspective view showing the fuel cell assembly A19 of the nineteenth embodiment.

FIG. 29B shows a fuel cell assembly A19 according to a nineteenth embodiment. In the 19th embodiment, a plurality of stack structures B are stacked and enclosed in a case. In the illustrated embodiment, two of the stack structures B are stacked and aligned vertically, and a tall case 340 encloses the stack of the two stack structures B. The fuel cell assembly A19 further includes one set of two inlet pipes 341 for introducing the first reactant gas into case 340, and one outlet pipe 342 for discharging the first reaction gas from case 340, so that these inlet and outlet pipes are used in common for the lower stack structure B and the upper stack structure B placed on the lower stack structure B. Each of the stack structures B is provided with guide members 50 each defining a circumferential passage with a circumferential wall of the tall common case 340.

The present invention is not limited to these embodiments. Various modifications and variations are possible. Though the illustrated embodiments employ examples using the solid electrolyte cells, it is possible to employ any of an electrode support type cell, an electrolyte support type cell, and a porous metal support type cell. For the cell plate and separator, it is desirable to choose materials having thermal expansion coefficients matching the thermal expansion coefficient of the cell. In the case of the fuel electrode support type cell using cermet of nickel, yttria stabilized zirconia as the fuel electrode, for example, it is preferable to use ferrite alloy having a thermal expansion coefficient of about 10.E-6[1/K]. Specifically, preferable materials are SUS430, ZMG232 superior in resistance to oxidation and resistance to corrosion, and Croffer22APU.

In the illustrated examples, the circumferential walls or rims of the cell plate and separator are joined together to form a frame or frame structure of each cell unit. However, it is optional to employ a structure in which a circumferential wall is formed only in one of the cell plate and separator, and arranged to define the space between the cell plate and separator for causing one of the fuel gas and air to flow therein. As the method for joining the cell plate and separator, there are brazing and ultrasonic joining besides the before-mentioned methods such as welding.

In the illustrated examples, each cell unit 10 includes only one cell 11. However, each cell unit may include two or more cells 11. For example, a cell plate has an annular region between a central region and an outer peripheral region, and a plurality of cells are fixedly mounted in this annular region of the cell plate. In this example, when the cells are in the form of a small circular plate, it is preferable to arrange the cells regularly around the center of the cell plate. When the cells are annular, it is preferable to employ press-formed inner and outer rings joined to the inner and outer circumference of each annular cell. In this case, it is optional to form a frame structure by connecting the inner ring and outer ring. Moreover, it is possible to attach a fan-shaped cell or more to the frame structure with an adhesive or some other joining method.

The case is a gastight container, as mentioned before. However, the case may be a heat insulating container, or the case per se may not be a heat insulating container. For example, the stack structure may be installed through an insulating container in the case which is not heat-insulating per se.

When an off gas of a reformer is used as a reactant gas (fuel gas), it is preferable to use a cathode gas that is air as the first reactant gas to be introduced into the case from the inlet port and discharged through the outlet port in order to perform the temperature adjustment in the stack structure since the temperature of the off gas is almost invariable.

In the illustrated examples, the outer collector (15) is in the form of an electrically conductive porous member. However, it is possible to employ various forms of the outer collector. For example, as the outer collector, it is possible to employ fabric of fibers of electrode material, nonwoven fabric, felt, or form. Specifically, Ni alloy such as Inconel (registered trademark) holding elasticity at a high temperature is preferable.

In the first embodiment, the heat transfer section is in the form of projections 51 or 52 formed on at least one guide member. However, it is possible to form minute projections or corrugations on the surface or surfaces of at least one of the outer collector (15), cell plate (14), separator (13) and inner collector (12) (by cutting work or by growing whiskers, for example). Thus, the heat transfer section may be corrugations or projections formed on the stack structure, or formed on each of the cell units.

This structure can increase the area of contact with the first reactant gas introduced from the inlet port without changing the sizes of the guide members and stack structure, so that this structure can improve the heat exchanging efficiency and reduce the size of the case simultaneously. In this case, the area of contact can be increased significantly by the growth of oxide whiskers of micron size. The thus-formed oxide whiskers can increase the area of contact, and improve the heat exchanging efficiency though the heat conductivity is slightly poorer than the metallic material.

The gas guide may include at least one guide member including a surface arranged to carry combustion catalyst. For example, the gas guide includes a guide member having a surface coating layer of combustion catalyst. At the time of starting, the fuel cell system introduce the first reactant gas such as fuel gas into the case, and thereby warms the surface of the guide member. In this way, the fuel cell system can perform a heating operation while holding the stack temperature distribution uniform at the time of starting or low load operation requiring heating. Thus, at least one of the outlet port and the guide member may be arranged to carry combustion catalyst. Furthermore, the guide member may be made of a heat conductive porous material.

This application is based on a prior Japanese Patent Application No. 2007-291735 filed on Nov. 9, 2007. The entire contents of the prior Japanese Patent Application No. 2007-291735 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A fuel cell apparatus comprising:
   a stack structure including a plurality of solid electrolyte cell units that are arranged in a stack and separated by interspaces;
   a case including a circumferential wall that surrounds the stack structure;
   an inlet port configured to introduce a reactant gas into the case;
   an outlet port configured to discharge the reactant gas from the case; and
   a gas guide,
   wherein the gas guide includes a guide member extending longitudinally along an outer periphery of the stack structure from a position near the inlet port to cover portions of the interspaces of the stack structure,
   wherein the guide member includes an outside surface defining at least a portion of a circumferential fluid passage between the guide member and the circumferential wall of the case,
   wherein the guide member includes a portion defining an open region, the open region being configured to allow the reactant gas to flow from the circumferential fluid passage into the stack structure,
   wherein the gas guide surrounds the stack structure partly and divides the outer periphery of the stack structure into (i) a closed region which is covered by the gas guide and which is arranged to prevent the reactant gas from flowing into the stack structure from the circumferential fluid passage, and (ii) the open region which is not covered by the gas guide and which is arranged to allow the reactant gas to flow into the stack structure from the circumferential fluid passage, and
   wherein the guide member contacts the stack structure over at least half of the outer periphery of the stack structure.

2. The fuel cell apparatus as claimed in claim 1, wherein the stack structure is cylindrical, and the guide member extends circumferentially in the form of an arc of a circle around a center axis of the stack structure.

3. The fuel cell apparatus as claimed in claim 1, wherein:
   the gas guide includes a plurality of the guide members, each including the outside surface which is a convex outside surface that defines the circumferential fluid passage with the circumferential wall of the case,
   the plurality of the guide members are configured to cause the reactant gas to flow circumferentially toward the open region, through the circumferential fluid passage, and
   the gas guide includes a concave inside surface configured to prevent the reactant gas from flowing radially outward from the stack structure, and to cause the reactant gas introduced through the open region into the stack structure to flow toward the outlet port through the interspaces of the stack structure.

4. The fuel cell apparatus as claimed in claim 1, wherein the gas guide includes the guide member which is a first guide member, and a second guide member, the first and second guide members extending from the outlet port in opposite directions around the stack structure, and terminating at respective forward ends between which the open region is defined.

5. The fuel cell apparatus as claimed in claim 1, wherein the gas guide is symmetrical with respect to an imaginary median plane bisecting the stack structure and the outlet port.

6. The fuel cell apparatus as claimed in claim 1, wherein the gas guide further includes an inside insulating layer which is interposed between the guide member and the stack structure, and which is electrically insulating and thermally conductive.

7. The fuel cell apparatus according to claim 1, wherein the gas guide further includes an outer deflector, wherein the outer deflector includes:
an inside surface defining an additional portion of the circumferential fluid passage between the guide member and the outer deflector,
an outside surface defining an outer passage between the circumferential wall of the case and the outer deflector, and
a portion defining an outer opening configured to allow the reactant gas to flow from the outer passage to the circumferential fluid passage.

8. The fuel cell apparatus according to claim 7, wherein the outlet port is located on a first side of the stack structure, the open region is located on a second side of the stack structure, the stack structure is located between the outlet port and the open region, the inlet port is located on the second side of the stack structure and the outer opening is located on the first side of the stack structure.

9. The fuel cell apparatus as claimed in claim 1, wherein the gas guide further comprises an outside heat transfer section which is disposed between the guide member and the circumferential wall of the case.

10. The fuel cell apparatus as claimed in claim 9, wherein the outside heat transfer section is projected outwards into the circumferential fluid passage, and arranged to transfer heat between the reactant gas flowing in the circumferential fluid passage and the stack structure.

11. The fuel cell apparatus as claimed in claim 9, wherein the circumferential wall of the case includes an inside surface covered with a circumferential insulating layer of an electrically insulating, thermally conductive material, and the outside heat transfer section projects into the circumferential fluid passage and abuts on the circumferential insulating layer of the circumferential wall of the case.

12. The fuel cell apparatus as claimed in claim 9, wherein the outlet port includes an outlet pipe and an outlet insulating layer, and the outside heat transfer section abuts on the outlet insulating layer of the outlet port.

13. The fuel cell apparatus as claimed in claim 9, wherein the outside heat transfer section includes at least one of a corrugation, a radial fin, a circumferential fin, and a porous portion of a porous material.

14. The fuel cell apparatus as claimed in claim 1, wherein the guide member of the gas guide is a segmented guide member including guide segments each covering a portion of at least one of the interspaces among the cell units.

15. The fuel cell apparatus as claimed in claim 14, wherein the segmented guide member further includes a plurality of insulating segments each disposed between two of the guide segments.

16. The fuel cell apparatus as claimed in claim 14, wherein the segmented guide member further comprises a plurality of insulating segments each disposed between one of the guide segments and one of the cell units.

17. The fuel cell apparatus as claimed in claim 14, wherein each of the guide segments includes an insulating wall segment which covers one of the interspaces and which is made of an electrically insulating material.

18. The fuel cell apparatus as claimed in claim 14, wherein the gas guide further comprises heat transfer segments each projecting radially outwards beyond the guide segments.

19. The fuel cell apparatus as claimed in claim 18, wherein the circumferential wall of the case includes an inside surface covered with a circumferential insulating layer of an electrically insulating, thermally conductive material, and each of the heat transfer segments abuts on the circumferential insulating layer of the circumferential wall of the case.

20. The fuel cell apparatus as claimed in claim 18, wherein each of the cell units includes a frame member and an inner member disposed in the frame member, the stack structure includes a plurality of stack units each including one of the cell units and one of outer members each disposed in one of the interspaces formed between the frame members of adjacent two of the cell units, and each of the stack units is provided with one of the guide segments covering a portion of an outer periphery of the outer member, and one of the heat transfer segments projecting radially outwards from one of the guide segments, the frame member, the inner member and the outer member.

21. The fuel cell apparatus as claimed in claim 14, wherein the stack structure comprises outer members each disposed in one of the interspaces between two of the cell units, each of the guide segments extends around one of the outer members at a predetermined radial position, and each of the cell units extends radially outward beyond the radial position of the guide segments, toward the circumferential wall of the case.

22. The fuel cell apparatus according to claim 14, wherein the outlet port comprises a segmented outlet pipe including pipe segments insulated from one another.

23. The fuel cell apparatus according to claim 22, wherein each of the guide segments is fixed to one of the pipe segments of the segmented outlet pipe.

24. The fuel cell apparatus according to claim 1, wherein the outlet port comprises an outlet pipe formed with a set of outlet holes each opened toward one of the interspaces of the stack structure.

25. The fuel cell apparatus according to claim 24, wherein the outlet port further includes an outlet insulating layer, and each of the cell units abuts on the outlet insulating layer.

26. The fuel cell apparatus according to claim 24, wherein the outlet port comprises a plurality of the outlet pipes and each of the interspaces of the stack structure is confronted by at least one of the outlet holes.

27. The fuel cell apparatus according to claim 26, wherein the plurality of outlet pipes includes at least a first outlet pipe and a second outlet pipe, the first outlet pipe being separated from the second outlet pipe circumferentially around the stack structure, and the outlet holes of the first outlet pipe being in different locations than the outlet holes of the second outlet pipe.

28. The fuel cell apparatus as claimed in claim 1, wherein the fuel cell apparatus further comprises a reaction tube to supply a second reactant gas into the cell units, and the reaction tube is so arranged that heat is transferred between the reaction tube and the outlet port.

29. The fuel cell apparatus as claimed in claim 1, wherein the fuel cell apparatus comprises a plurality of the stack structures each provided with the gas guide, and the circumferential wall of the case encloses the stack structures, and defines the circumferential fluid passage with each of the gas guides.

30. The fuel cell apparatus as claimed in claim 1, wherein the guide member of the gas guide closes the interspaces of the stack structure by extending circumferentially on the outer periphery of the stack structure, and
wherein the guide member of the gas guide includes:
the outside surface which is an outside convex surface defining the circumferential fluid passage to introduce the reactant gas into the stack structure through the open region, and an inside concave surface curved to guide the reactant gas to flow in the stack structure circumferentially around a central portion of the stack structure toward the outlet port.

31. The fuel cell apparatus as claimed in claim 1, wherein the guide member contacts the stack structure via an insulating layer that is sandwiched between the guide member and the stack structure.

* * * * *